US012568880B2

(12) United States Patent 
Dai et al.

(10) Patent No.: US 12,568,880 B2 
(45) Date of Patent: Mar. 10, 2026

(54) RIDING LAWN MOWER, DISPLAY INTERFACE OF A POWER TOOL AND RIDING MACHINE

(71) Applicant: Nanjing Chervon Industry Co., Ltd., Nanjing (CN)

(72) Inventors: Cheng Dai, Nanjing (CN); Xi Chen, Nanjing (CN); Toshinari Yamaoka, Nanjing (CN); Min Zhang, Nanjing (CN); Zhen Wang, Nanjing (CN); Lei Wang, Nanjing (CN); Xu Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/740,179

(22) Filed: Jun. 11, 2024

(65) Prior Publication Data

US 2024/0324501 A1 Oct. 3, 2024

Related U.S. Application Data

(63) Continuation of application No. 18/320,304, filed on May 19, 2023, now Pat. No. 12,035,654, which is a 
(Continued)

(51) Int. Cl. 
A01D 34/82 (2006.01) 
A01D 34/64 (2006.01) 
(Continued)

(52) U.S. Cl. 
CPC ........... A01D 34/824 (2013.01); A01D 34/64 (2013.01); A01D 34/6818 (2013.01); 
(Continued)

(58) Field of Classification Search 
CPC .. A01D 34/824; A01D 34/64; A01D 34/6818; 
A01D 34/69; A01D 69/02; 
(Continued)

(56) References Cited

U.S. PATENT DOCUMENTS

| | | | | |
|---|---|---|---|---|
| 3,561,282 A | * | 2/1971 | Hershman | .............. A01D 34/64 |
| | | | | 280/775 |
| 3,732,671 A | | 5/1973 | Allen | |

(Continued)

FOREIGN PATENT DOCUMENTS

| | | |
|---|---|---|
| AU | 2003200523 B2 | 9/2004 |
| CN | 1307445 A | 8/2001 |

(Continued)

OTHER PUBLICATIONS

Extended European Search Report from European application No. 21957152.8, dated Jan. 2, 2024, 6 pp. 
(Continued)

*Primary Examiner* — Jason D Shanske 
*Assistant Examiner* — Scott Lawrence Strickler 
(74) *Attorney, Agent, or Firm* — Greenberg Traurig, LLP

(57) ABSTRACT

A riding lawn mower includes a seat, a chassis configured to support the seat, a cutting assembly mounted to the chassis, a walking assembly configured to drive the riding lawn mower to walk on a plane, and a steering wheel assembly. The steering wheel assembly includes a steering wheel operable by the user and a connecting rod configured to connect the steering wheel and the chassis. The steering wheel assembly further includes a pivot assembly that rotatably connects the connecting rod and the chassis, and the pivot assembly enables the steering wheel assembly to switch between a working position and a storage position. A distance between the steering wheel and the plane when the steering wheel assembly is in the storage position is smaller (Continued)

than a distance between the steering wheel and the plane when the steering wheel assembly is in the working position.

19 Claims, 21 Drawing Sheets

Related U.S. Application Data continuation of application No. PCT/CN2021/119302, filed on Sep. 18, 2021.

(51) Int. Cl.

| | |
|---|---|
| *A01D 34/68* | (2006.01) |
| *A01D 34/69* | (2006.01) |
| *A01D 34/78* | (2006.01) |
| *A01D 69/02* | (2006.01) |
| *B60K 26/02* | (2006.01) |
| *B60L 50/60* | (2019.01) |
| *B62D 1/04* | (2006.01) |
| *A01D 101/00* | (2006.01) |

(52) U.S. Cl.

CPC ............. *A01D 34/69* (2013.01); *A01D 69/02* (2013.01); *B60K 26/02* (2013.01); *B62D 1/046* (2013.01); *A01D 2034/6843* (2013.01); *A01D 34/78* (2013.01); *A01D 2101/00* (2013.01); *B60K 2026/024* (2013.01); *B60K 2026/025* (2013.01); *B60K 2026/028* (2013.01); *B60L 50/60* (2019.02); *B60L 2200/40* (2013.01)

(58) Field of Classification Search

CPC ............ A01D 34/78; A01D 2034/6843; A01D 2101/00; B60K 26/02; B60K 2026/024; B60K 2026/025; B60K 2026/028; B62D 1/046; B60L 50/60; B60L 2200/40

See application file for complete search history.

(56) References Cited

U.S. PATENT DOCUMENTS

| | | | |
|---|---|---|---|
| 5,406,778 A | | 4/1995 | Lamb |
| 5,713,189 A | | 2/1998 | Toman |
| 5,865,016 A | | 2/1999 | Toman |
| 5,934,400 A | | 8/1999 | Larsen |
| 8,011,678 B1 | | 9/2011 | Bell |
| 9,220,193 B2 | | 12/2015 | Goman |
| 9,624,890 B2 | | 4/2017 | Koenen |
| 9,668,405 B2 | | 6/2017 | Albinger |
| 9,679,419 B2 | | 6/2017 | Dwyer |
| 10,058,031 B1 | | 8/2018 | Brown |
| 10,293,853 B2 | | 5/2019 | Koike et al. |
| 2004/0002775 A1 | | 1/2004 | Kerner |
| 2004/0099468 A1 | * | 5/2004 | Chernoff .................. B60T 7/10 |
| | | | 180/409 |
| 2007/0295545 A1 | | 12/2007 | Bernard et al. |
| 2009/0000839 A1 | | 1/2009 | Ishii |
| 2009/0188226 A1 | | 7/2009 | Carlson |
| 2009/0224710 A1 | | 9/2009 | Mir |
| 2012/0159916 A1 | | 6/2012 | Ishii |
| 2012/0317949 A1 | | 12/2012 | Abe et al. |
| 2013/0030667 A1 | | 1/2013 | Fujimoto |
| 2015/0201556 A1 | | 7/2015 | Ito |
| 2015/0308569 A1 | | 10/2015 | Heathcoat, Jr. |
| 2016/0106031 A1 | | 4/2016 | Bejcek |
| 2017/0217488 A1 | | 8/2017 | Koike |
| 2017/0265395 A1 | | 9/2017 | Kuriyagawa |
| 2018/0177128 A1 | | 6/2018 | Kuriyagawa et al. |
| 2018/0338415 A1 | | 11/2018 | Wyatt |
| 2018/0352736 A1 | | 12/2018 | Kulkarni |
| 2019/0161081 A1 | | 5/2019 | Ogura |

| | | | |
|---|---|---|---|
| 2020/0205338 A1 | | 7/2020 | Zeiler et al. |
| 2020/0245560 A1 | * | 8/2020 | Legault ................. B60W 20/15 |
| 2022/0124972 A1 | * | 4/2022 | Dai ...................... A01D 34/006 |
| 2022/0287218 A1 | | 9/2022 | Yuasa |

FOREIGN PATENT DOCUMENTS

| | | | | |
|---|---|---|---|---|
| CN | 101032957 A | | 9/2007 | |
| CN | 201941824 U | | 8/2011 | |
| CN | 203410502 U | | 1/2014 | |
| CN | 102448283 A | | 4/2015 | |
| CN | 104509297 A | | 4/2015 | |
| CN | 104554255 A | | 4/2015 | |
| CN | 105383544 A | | 3/2016 | |
| CN | 205454604 U | | 8/2016 | |
| CN | 205922034 U | | 2/2017 | |
| CN | 104166372 B | | 4/2017 | |
| CN | 107521456 A | | 12/2017 | |
| CN | 109379976 A | | 2/2019 | |
| CN | 110313296 A | | 10/2019 | |
| CN | 110741810 A | | 2/2020 | |
| CN | 210671321 U | | 6/2020 | |
| CN | 111492783 A | | 8/2020 | |
| CN | 211171513 U | | 8/2020 | |
| CN | 211210526 U | | 8/2020 | |
| CN | 111756280 A | | 10/2020 | |
| CN | 211793024 U | | 10/2020 | |
| CN | 110677079 B | | 2/2021 | |
| CN | 111516747 A | | 4/2021 | |
| CN | 112740893 A | | 5/2021 | |
| CN | 113243196 A | | 8/2021 | |
| CN | 113273078 A1 | | 8/2021 | |
| CN | 110989578 A | | 8/2023 | |
| EP | 2105337 A1 | | 12/2011 | |
| EP | 2385755 B1 | | 3/2013 | |
| EP | 2740344 A2 | | 6/2014 | |
| EP | 3175697 A1 | | 6/2017 | |
| EP | 3338526 A1 | | 6/2018 | |
| JP | 4270079 B2 | | 5/2009 | |
| JP | 4605649 B2 | | 1/2011 | |
| JP | 2012065602 A | | 4/2012 | |
| WO | 2009041177 A1 | | 4/2009 | |
| WO | 2010079301 A1 | | 7/2010 | |
| WO | 2019130563 A1 | | 7/2019 | |
| WO | 2021004448 A1 | | 1/2021 | |
| WO | WO-2021004484 A1 | * | 1/2021 | ........... A01D 34/006 |

OTHER PUBLICATIONS

Extended European Search Report from European application No. 21960293.5, dated Nov. 9, 2023, 11 pp.
International Search Report and written Opinion, PCT/CN2021/119281, Jun. 21, 2022, 16 pages.
International Search Report and Written Opinion, PCT/CN2021/119302, Jun. 23, 2022, 24 pages.
International Search Report and written Opinion, PCT/CN2021/120368, Jun. 22, 2022, 13 pages.
International Search Report and Written Opinion, PCT/CN2021/124115, Jul. 1, 2022, 14 pages.
Non-final Office Action from U.S. Appl. No. 18/327,653, dated Sep. 5, 2025, 19 pp.
Extended European Search Report from application No. 25156406.8, dated Apr. 3, 2025, 5 pp.
Non-final Office Action from U.S. Appl. No. 18/320,586, dated Nov. 26, 2025, 15 pp.
Phys Org "30 Magnetic Sensor for Rapid-Reaction Gas Pedal" published Jun. 5, 2005, accessed Nov. 14, 2025, at https://phys.org/news/2005-06-3d-magnetic-sensor-rapid-reaction-gas.html.
Machine translation of CN104166372.
Machine translation of CN110677079.
Non-final Office Action from U.S. Appl. No. 18/328,005, dated Dec. 29, 2025, 26 pp.

\* cited by examiner

2104

1365

2103

2104                                    2104

2103

2104

RIDING LAWN MOWER, DISPLAY INTERFACE OF A POWER TOOL AND RIDING MACHINE

RELATED APPLICATION INFORMATION

This application is a continuation of U.S. application Ser. No. 18/320,304, filed on May 19, 2023, which application is a continuation of International Application Number PCT/CN2021/119302, filed on Sep. 18, 2021, which applications are incorporated herein by reference in their entireties.

BACKGROUND

Lawn mowers are widely used in gardening to trim lawn and vegetation. Lawn mowers generally include hand push lawn mowers and riding lawn mowers. A user sits on and drives the riding lawn mower to perform lawn mowing tasks, making lawn mowing more efficient and less tiring. How to improve the driving experience of the riding lawn mower has been a subject that engineers have been consistently working on.

SUMMARY

According to an example, a riding lawn mower is provided including: a seat for a user to sit thereon; a chassis configured to support the seat; a cutting assembly mounted to the chassis, the cutting assembly including a cutting member for cutting grass; a walking assembly configured to drive the riding lawn mower to walk on a plane; and a steering wheel assembly, including a steering wheel operable by the user and a connecting rod configured to connect the steering wheel and the chassis; wherein the steering wheel assembly further includes a pivot assembly that rotatably connects the connecting rod and the chassis; the pivot assembly enables the steering wheel assembly to switch between a working position and a storage position; a distance between the steering wheel and the plane when the steering wheel assembly is in the storage position is smaller than a distance between the steering wheel and the plane when the steering wheel assembly is in the working position.

In one example, the connecting rod has a first end connected with the steering wheel and a second end connected with the chassis through the pivot assembly.

In one example, the riding lawn mower further includes a left cover member and a right cover member, the left cover member is located on a left side of the seat and the right cover member is located on a right side of the seat.

In one example, the right cover member covers the pivot assembly.

In one example, a height of the left cover member is lower than a height of the right cover member.

In one example, when the steering wheel assembly is in the working position, a difference of a perpendicular distance from a highest point of the steering wheel assembly to the plane and a perpendicular distance from a sitting surface of the seat to the plane is greater than or equal to 30 cm and less than or equal to 50 cm.

In one example, when the steering wheel assembly is in the working position, a perpendicular distance from a highest point of the steering wheel assembly to the plane is greater than or equal to 80 cm and less than or equal to 120 cm.

In one example, when the steering wheel assembly is in the working position, a distance between orthographic projections of the steering wheel assembly and a back of the seat on the plane is greater than or equal to 60 cm and less than or equal to 100 cm.

In one example, the steering wheel assembly further includes an adjustment device operable to adjust a height of the steering wheel.

In one example, the riding lawn mower further includes a pedal assembly, the riding lawn mower has a central axis, the riding lawn mower is at least partially symmetrical about a central vertical plane passing through the central axis, the pedal assembly and the second end are located on a same side of the central vertical plane.

According to an example, a riding lawn mower is provided including: a seat for a user to sit thereon; a chassis configured to support the seat; a cutting assembly mounted to the chassis, the cutting assembly including a cutting member for cutting grass; a walking assembly configured to drive the riding lawn mower to walk on a plane; a motor for driving the walking assembly; a steering wheel assembly, including a steering wheel operable by the user and a connecting rod configured to connect the steering wheel and the chassis; wherein the steering wheel assembly further includes: a mounting assembly, connecting the steering wheel and the connecting rod; a control circuit having a first state that permits the motor to start and a second state that prevents the motor from starting; and an operating member operable to switch the control circuit into the first state; the operating member is mounted to the steering wheel or the mounting assembly.

In one example, the operating member is coupled to a switch, and the operating member is operable to actuate the switch.

In one example, when the switch is actuated by the operating member, the control circuit is switched into the first state.

In one example, the operating member is at least one paddle shifter.

In one example, when the user holds the steering wheel with a hand, the paddle shifter is triggerable by at least one finger of the hand.

In one example, the operating member is a pair of paddle shifters, the pair of paddle shifters including a left paddle shifter and a right paddle shifter.

In one example, when the user holds the steering wheel with both hands, the left paddle shifter is triggerable by at least one finger of a left hand and the right paddle shifter is triggerable by at least one finger of a right hand.

In one example, the riding lawn mower further includes a start button, when the start button is pressed and the switch is actuated by the operating member, the control circuit is switched into the first state.

In one example, the steering assembly further includes a display interface, which has a printed circuit board, and a wire of the switch is electrically connected to the printed circuit board.

In one example, the walking assembly includes at least one first walking wheel and at least one second walking wheel, the second walking wheel is driven by the motor and the first walking wheel is configured to rotate freely.

According to an example, a riding lawn mower is provided including: a seat for a user to sit thereon; a chassis configured to support the seat; a cutting assembly mounted to the chassis, the cutting assembly including a cutting member for cutting grass; and a steering wheel assembly, including a steering wheel operable by the user and a connecting rod configured to connect the steering wheel and the chassis; wherein the steering wheel assembly further includes: a first circuit board mounted to the steering wheel assembly; a rotary shaft configured to form a synchronous rotation with the steering wheel; a mounting assembly that rotatably connects the steering wheel and the connecting rod; and a cable electrically connected to the first circuit board; wherein the rotary shaft has a through hole, and the cable passes through the through hole.

In one example, the mounting assembly further includes a mounting box fixedly connected with the connecting rod and rotatably supporting the rotary shaft.

In one example, the steering wheel assembly further includes a fixing plate, the fixing plate is fixed to the steering wheel, and the rotary shaft is fixedly coupled to the fixing plate.

In one example, the fixing plate includes a stopper projection to limit an angle of rotation of the steering wheel.

In one example, the rotary shaft is coupled with a magnetic element, the first circuit board has a position sensor that detects an angular position of the magnetic element.

In one example, the cable is further electrically connected to a second circuit board.

In one example, the steering wheel assembly further includes a display interface, the second circuit board is connected to the display interface.

In one example, the steering wheel assembly further includes an operating member, the operating member is coupled to a switch, and a wire of the switch is electrically connected to the second circuit board.

In one example, the steering wheel assembly further includes a damper, the rotary shaft and the damper transmit force through a belt drive.

In one example, the riding lawn mower further includes a walking assembly, the walking assembly includes at least one first walking wheel and at least one second walking wheel, the second walking wheel is driven by a motor and the first walking wheel is configured to rotate freely.

According to an example, a riding lawn mower is provided including: a seat for a user to sit thereon; a chassis configured to support the seat; a cutting assembly mounted to the chassis, the cutting assembly including a cutting member for cutting grass; and a steering wheel operable by the user to control a steering direction of the riding lawn mower; wherein the steering wheel is configured to rotate about a first axis; the steering wheel has a first limit position when rotating clockwise about the first axis, and a second limit position when rotating counterclockwise about the first axis, wherein an angle that the steering wheel rotates from the first limit position to the second limit position is less than or equal to 380 degrees.

In one example, the steering wheel further has an initial position, an angle that the steering wheel rotates from the initial position to the first limit position is less than or equal to 190 degrees, an angle that the steering wheel rotates from the initial position to the second limit position is less than or equal to 190 degrees.

In one example, the steering wheel has a gap or a transparent portion on a top side of the steering wheel.

In one example, the steering wheel is substantially symmetrical about a second axis, the gap or the transparent portion is substantially symmetrical about the second axis.

In one example, a length of the gap or the transparent portion is greater than or equal to ⅕ of a perimeter of the steering wheel and less than or equal to ⅓ of the perimeter of the steering wheel.

In one example, the riding lawn mower further includes a display interface mounted on the steering wheel.

In one example, the riding lawn mower further includes a paddle shifter mounted near the steering wheel.

In one example, the steering wheel is coupled with a damper or a motor, which is configured to provide force feedback when the steering wheel is rotated.

In one example, the riding lawn mower further includes a height adjustment device operable to adjust a height of the steering wheel.

In one example, the riding lawn mower further includes a walking assembly, the walking assembly includes at least one first walking wheel and at least one second walking wheel, the second walking wheel is driven by a motor and the first walking wheel is configured to rotate freely.

According to an example, a riding lawn mower is provided including: a seat for a user to sit thereon; a chassis configured to support the seat; a cutting assembly mounted to the chassis, the cutting assembly including a cutting member for cutting grass; and a steering wheel assembly, including a steering wheel operable by the user and a connecting rod configured to connect the steering wheel and the chassis; wherein the riding lawn mower further includes: a pedal assembly operable by the user to control a walking speed of the riding lawn mower; wherein the riding lawn mower has a central axis, the riding lawn mower is at least partially symmetrical about a central vertical plane passing through the central axis, and the connecting rod has a first end connected with the steering wheel and a second end connected with the chassis, the pedal assembly and the second end of the connecting rod are located on a same side of the central vertical plane.

In one example, the riding lawn mower further includes a left cover member and a right cover member, the left cover member is located on a left side of the central vertical plane and the right cover member is located on a right side of the central vertical plane.

In one example, the right cover member covers the second end of the connecting rod.

In one example, a height of the left cover member is lower than a height of the right cover member.

In one example, the perpendicular distance from the left cover member to a plane on which the riding lawn mower walks is greater than or equal to 45 cm and less than or equal to 65 cm.

In one example, the left cover member has an oblique top surface.

In one example, a perpendicular distance from an outermost surface of the left cover member to the central vertical plane is greater than or equal to 30 cm and less than or equal to 50 cm.

In one example, a distance between orthographic projections of a front end of the riding lawn mower and a rear end of the left cover member on a plane on which the riding lawn mower walks is greater than or equal to 100 cm and less than or equal to 130 cm.

In one example, the riding lawn mower further includes a step bar mounted to the chassis, the step bar is located on an opposite side of central vertical plane to the pedal assembly.

In one example, the step bar has a first position parallel to the chassis and a second position perpendicular to the chassis.

According to an example, a riding lawn mower is provided including: a seat for a user to sit thereon; a chassis configured to support the seat; a cutting assembly mounted to the chassis, the cutting assembly including a cutting member for cutting grass; a walking assembly configured to drive the riding lawn mower to walk on a plane; a motor for driving the walking assembly; a steering wheel assembly, including a steering wheel operable by the user; wherein the riding lawn mower further includes: a control circuit configured to control the motor, the control circuit having a first state that permits the motor to rotate and a second state that prevents the motor from rotating; and an operating member operable to switch the control circuit into the first state; the operating member is mounted to the steering wheel.

In one example, the control circuit further has a third state, in which the control circuit stops the motor and then permits the motor to rotate reversely, and the operating member operable to switch the control circuit into the third state.

In one example, the operating member is at least one paddle shifter; when the control circuit is in the second state and the at least one paddle shifter is pressed, the control circuit is switched into the first state.

In one example, when the control circuit is in the first state and the at least one paddle shifter remains pressed for a time period greater than or equal to a first time threshold, the control circuit is switched into the third state.

In one example, when the control circuit is in the first state and the at least one paddle shifter remains pressed for a time period greater than or equal to a first time threshold, the control circuit determines if a rotational speed of the motor is less than or equal to a first velocity threshold, and if the rotational speed of the motor is less than or equal to the first velocity threshold, the control circuit is switched into the third state.

In one example, when the control circuit is in the third state and the at least one paddle shifter is released, the control circuit is switched into the first state.

In one example, a maximum rotational speed of the motor when the control circuit is in the third state is less than a maximum rotational speed of the motor when the control circuit is in the first state.

In one example, a maximum turning angle of the riding lawn mower when the control circuit is in the third state is less than a maximum turning angle of the motor when the control circuit is in the first state.

In one example, the riding lawn mower has a plurality of driving modes.

In one example, an acceleration of the control circuit switching from the first state to the third state varies across the plurality of driving modes.

According to an example, a display interface of a power tool is provided, including: a casing; and a screen layer accommodated in the casing; wherein the casing including a cover layer configured to protect and display the screen layer; the display interface further includes: a first seal and a second seal, the first seal seals a first chamber between the cover layer and the screen layer, the first seal and second seal seals a second chamber abutting the first chamber.

In one example, the second chamber is between an inner wall of the casing and a side surface of the screen layer.

In one example, the first seal and the second seal are flexible adhesives.

In one example, a thickness of the cover layer is greater than 2 mm and less than or equal to 5 mm.

In one example, a distance between the cover layer and the screen layer is greater than 0.1 mm and less than or equal to 3 mm.

In one example, the cover layer and the casing are integrated into one piece.

In one example, the cover layer and the casing are capsulated.

In one example, Nano coating is applied to both sides of the cover layer.

In one example, the screen layer is an LCD screen or an LED screen.

In one example, the cover layer is made of tempered glass or polycarbonate (PC) materials.

According to an example, a display interface of a power tool is provided, including: a casing; a screen layer accommodated in the casing; and a printed circuit board disposed under the screen layer; wherein the casing including a cover layer configured to protect and display the screen layer; the display interface further includes: a seal applied between the screen layer and the casing; the seal seals a chamber at least including a space between the cover layer and the screen layer, and a height of the space between the cover layer and the screen layer is greater than 0.1 mm and less than or equal to 3 mm.

In one example, the seal is made of flexible adhesives.

In one example, a thickness of the cover layer is greater than 2 mm and less than or equal to 5 mm.

In one example, the cover layer has a projecting portion, the casing is formed with a groove, the projecting portion mates with the groove.

In one example, the cover layer and the casing are capsulated.

In one example, Nano coating is applied to both sides of the cover layer.

In one example, the cover layer is made of tempered glass or polycarbonate (PC) materials.

In one example, the screen layer is an LCD screen or an LED screen.

In one example, the cover layer and the casing are integrated into one piece.

In one example, the screen layer includes a back layer, the back layer has a rib portion projecting toward the printed circuit board, and the seal is applied between the rib portion of the back layer and an inner wall of the casing.

According to an example, a display interface of a power tool is provided, including: a casing; a printed circuit board accommodated in the casing, the printed circuit board has a plurality of light-emitting elements; and a light-guiding layer configured to guide light emitted by the plurality of light-emitting elements; wherein the display interface further includes: a seal applied between the printed circuit board and the casing, the seal being made of flexible adhesives.

In one example, the light-guiding layer and the casing are integrated into one piece.

In one example, the display interface further includes a sticker adhered to the casing or the light-guiding layer.

In one example, a thickness of the casing is greater than 2 mm and less than or equal to 5 mm.

In one example, the casing is made of tempered glass or polycarbonate (PC) materials.

According to an example, a display interface of a power tool is provided, including: a casing; a screen layer accommodated in the casing; and wherein the display interface further includes: a seal applied between the screen layer and the casing, the seal being made of flexible adhesives.

In one example, the casing includes a cover layer configured to protect and display the screen layer.

In one example, the cover layer and the casing are integrated into one piece.

In one example, the casing is made of tempered glass or polycarbonate (PC) materials.

In one example, the screen layer includes a rib portion, and the seal is applied between the rib portion and an inner wall of the casing.

According to an example, a riding machine is provided, including: a seat for a user to sit thereon; a chassis configured to support the seat; a walking assembly configured to drive the riding machine to walk on a plane; and a steering wheel assembly, including a steering wheel operable by the user and a connecting rod configured to connect the steering wheel and the chassis; wherein the steering wheel assembly further includes a pivot assembly that rotatably connects the connecting rod and the chassis; the pivot assembly enables the steering wheel assembly to switch between a working position and a storage position; a distance between the steering wheel and the plane when the steering wheel assembly is in the storage position is smaller than a distance between the steering wheel and the plane when the steering wheel assembly is in the working position.

According to an example, a riding machine is provided, including: a seat for a user to sit thereon; a chassis configured to support the seat; a walking assembly configured to drive the riding machine to walk on a plane; a motor for driving the walking assembly; and a steering wheel assembly, including a steering wheel operable by the user and a connecting rod configured to connect the steering wheel and the chassis; wherein the steering wheel assembly further includes: a mounting assembly, connecting the steering wheel and the connecting rod; a control circuit having a first state that permits the motor to start and a second state that prevents the motor from starting; and an operating member operable to switch the control circuit into the first state; the operating member is mounted to the steering wheel or the mounting assembly.

According to an example, a riding machine is provided, including: a seat for a user to sit thereon; a chassis configured to support the seat; and a steering wheel assembly, including a steering wheel operable by the user and a connecting rod configured to connect the steering wheel and the chassis; wherein the steering wheel assembly further includes: a first circuit board mounted to the steering wheel assembly; a rotary shaft configured to form a synchronous rotation with the steering wheel; a mounting assembly that rotatably connects the steering wheel and the connecting rod; and a cable electrically connected to the first circuit board; wherein the rotary shaft has a through hole, and the cable passes through the through hole.

According to an example, a riding machine is provided, including: a seat for a user to sit thereon; a chassis configured to support the seat; and a steering wheel operable by the user to control a steering direction of the riding machine; wherein the steering wheel is configured to rotate about a first axis; the steering wheel has a first limit position when rotating clockwise about the first axis, and a second limit position when rotating counterclockwise about the first axis, wherein an angle that the steering wheel rotates from the first limit position to the second limit position is less than or equal to 380 degrees.

According to an example, a riding machine is provided, including: a seat for a user to sit thereon; a chassis configured to support the seat; and a steering wheel assembly, including a steering wheel operable by the user and a connecting rod configured to connect the steering wheel and the chassis; wherein the riding machine further includes: a pedal assembly operable by the user to control a walking speed of the riding machine; wherein the riding machine has a central axis, the riding machine is at least partially symmetrical about a central vertical plane passing through the central axis, and the connecting rod has a first end connected with the steering wheel and a second end connected with the chassis, the pedal assembly and the second end of the connecting rod are located on a same side of the central vertical plane.

According to an example, a riding machine is provided, including: a seat for a user to sit thereon; a chassis configured to support the seat; a walking assembly configured to drive the riding machine to walk on a plane; a motor for driving the walking assembly; and a steering wheel assembly, including a steering wheel operable by the user; wherein the riding machine further includes: a control circuit configured to control the motor, the control circuit having a first state that permits the motor to rotate and a second state that prevents the motor from rotating; and an operating member operable to switch the control circuit into the first state; the operating member is mounted to the steering wheel.

DETAILED DESCRIPTION

Figure 1:
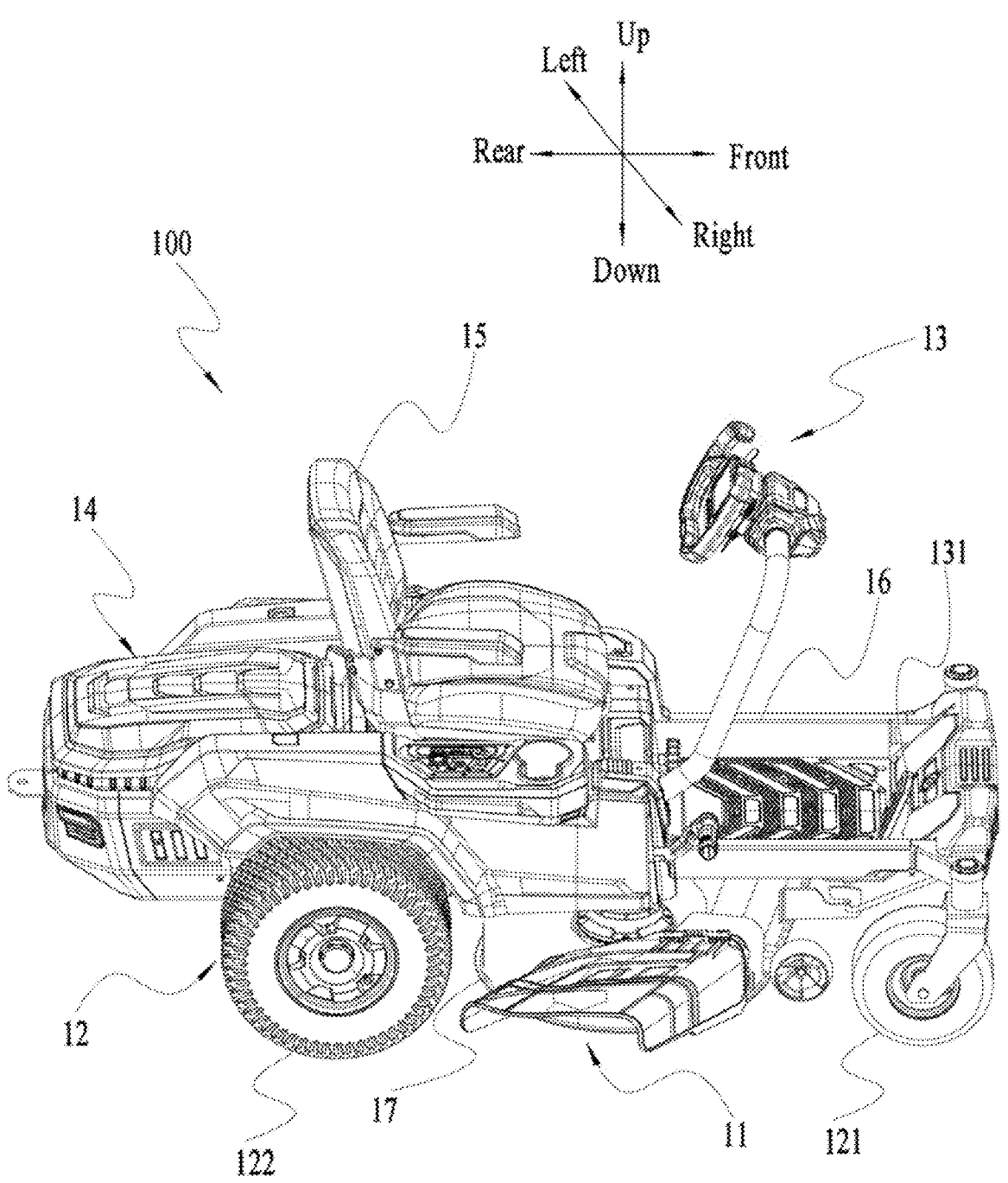
FIG. 1 is a perspective view of a riding lawn mower in a working position according to an example of the present application.

As shown in FIG. 1, a riding lawn mower 100 can be operated by a user sitting on the riding lawn mower 100 to effectively and quickly trim the lawn, vegetation, etc. Comparing with hand push/walk behind lawn mowers, the riding lawn mower 100 of the present disclosure does not require the user to push the machine, nor does it require the user to walk on the ground. Further, because of its large size, the riding lawn mower 100 is able to carry larger or more batteries, which brings a longer working time, so that the user can trim larger lawn areas, and trim for a longer time effortlessly. Furthermore, in terms of energy source, unlike existing riding lawn mowers, the riding lawn mower 100 uses electric energy rather than gasoline or diesel, thus the riding lawn mower 100 is more environmentally friendly, cheaper in usage cost, and less prone to leakage, failure and maintenance.

It is appreciated that aspects of this disclosure are also applicable to riding machines of other types, as long as the riding machine can output power in other forms besides walking power in order to realize other functions besides walking, such as, for example, riding snow blowers, riding agricultural machines, and riding sweepers. In fact, as long as these tools include the substance described below in this disclosure, they all fall within the scope of this disclosure.

Those skilled in the art should understand that, in the disclosure of this application, the terms "controller", "control unit", "module", "unit" and "processor" may include or relate to at least one of hardware or software.

Those skilled in the art should understand that, in the disclosure of this application, the terms "up", "down", "front", "rear", "left", "right" and the like indicate the orientation or positional relationship based on the orientation or positional relationship shown in the drawings, which are only for the convenience of describing the present application, and do not indicate or imply that the device or element referred to must have a specific orientation, or be constructed and operated in a specific orientation, and therefore the above terms should not be understood as a limitation of the present application.

Referring to FIGS. 1-4, the riding lawn mower 100 includes: a cutting assembly 11, a walking assembly 12, an operating assembly 13, a power supply assembly 14, a seat 15, a chassis 16, and a deck 17. The chassis 16 is the main supporting frame of the riding lawn mower 100, and the chassis 16 at least partially extends in a front and rear direction. The seat 15 is configured for a user to sit thereon, and the seat 15 is mounted on the chassis 16. The deck 17 is configured to accommodate the cutting assembly 11, and the deck 17 is installed under the chassis 16.

Figure 3:
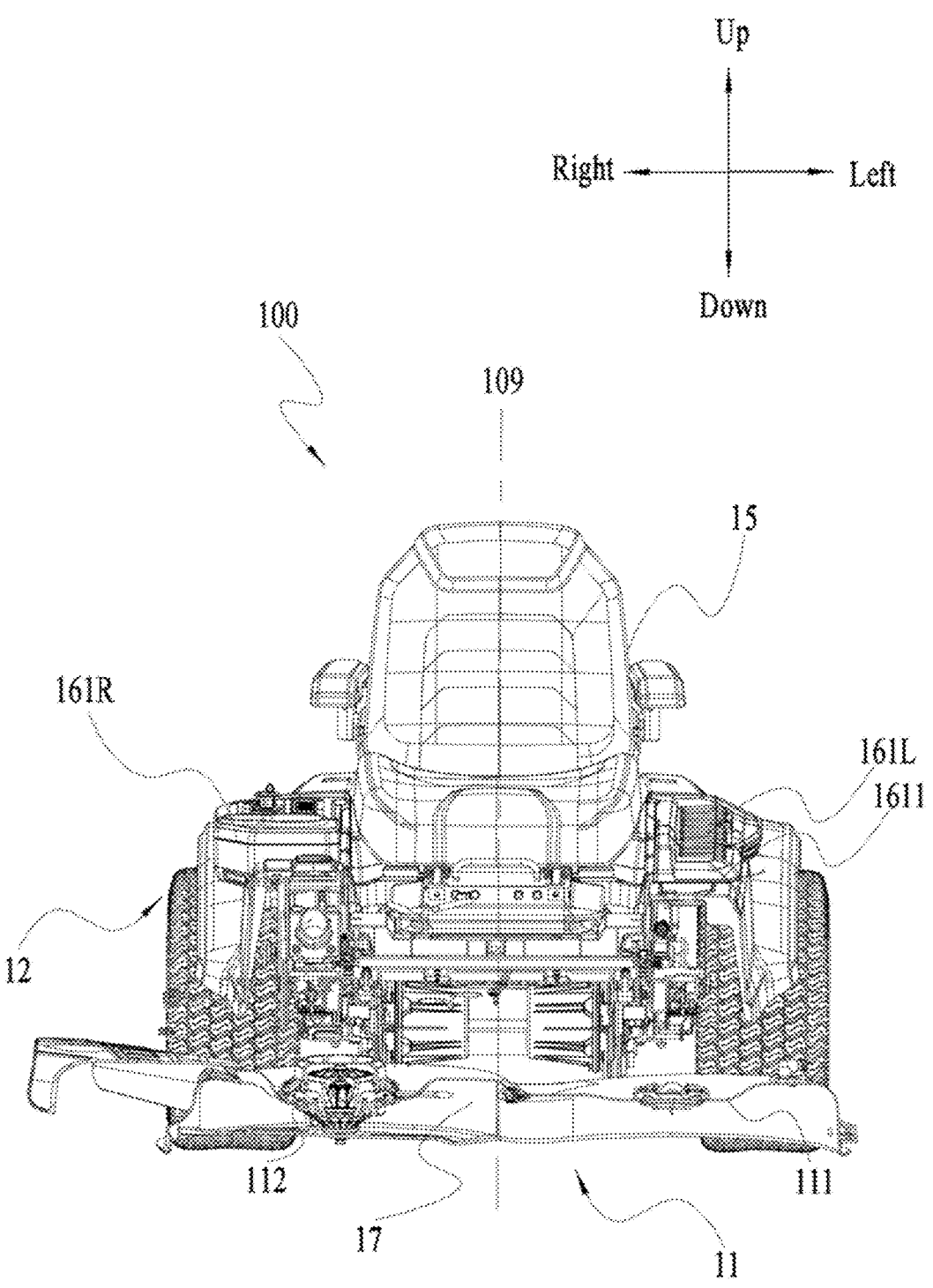
FIG. 3 is a sectional view of the riding lawn mower in FIG. 1.

According to FIG. 1, the direction toward which the user sits on the seat 15 is defined as the front or the front side of the riding lawn mower 100; and the direction opposite to the front is defined as the rear or rear side of the riding lawn mower 100. The user's left hand direction is defined as the left or left side of the riding lawn mower 100; and the user's right hand direction is defined as the right or right side of the riding lawn mower 100. The direction toward the plane on which the riding lawn mower 100 walks is defined as the down or lower side of the riding lawn mower 100; and the direction opposite to the down is defined as the up or upper side of the riding lawn mower 100. Referring to FIG. 3, the riding lawn mower has a central axis 106 extending in the longitudinal direction, or front and rear direction of the riding lawn mower 100; the riding lawn mower is at least partially symmetrical about a central vertical plane 109 passing through the central axis 106; the left side of the riding lawn mower 100 is on the left side of the vertical pane and the right side of the riding lawn mower 100 is on the right side of the vertical pane. The chassis 16 includes at least a left longitudinal beam 161L and a right longitudinal beam 161R extending in the longitudinal direction of the riding lawn mower 100, wherein the left longitudinal beam 161L and right longitudinal beam 161R are respectively located on the left and right side of the riding lawn mower 100 and are symmetrical about the central vertical plane 109. In some examples, the riding lawn mower 100 includes a left cover member 162L and a right cover member 162R, respectively located on the left side of the seat 15 and the right side of the seat 15. The left cover member 162L is mounted to the left longitudinal beam 161L of the chassis 16; the right cover member 162R is mounted to the right longitudinal beam 161R of the chassis 16.

Figure 4:
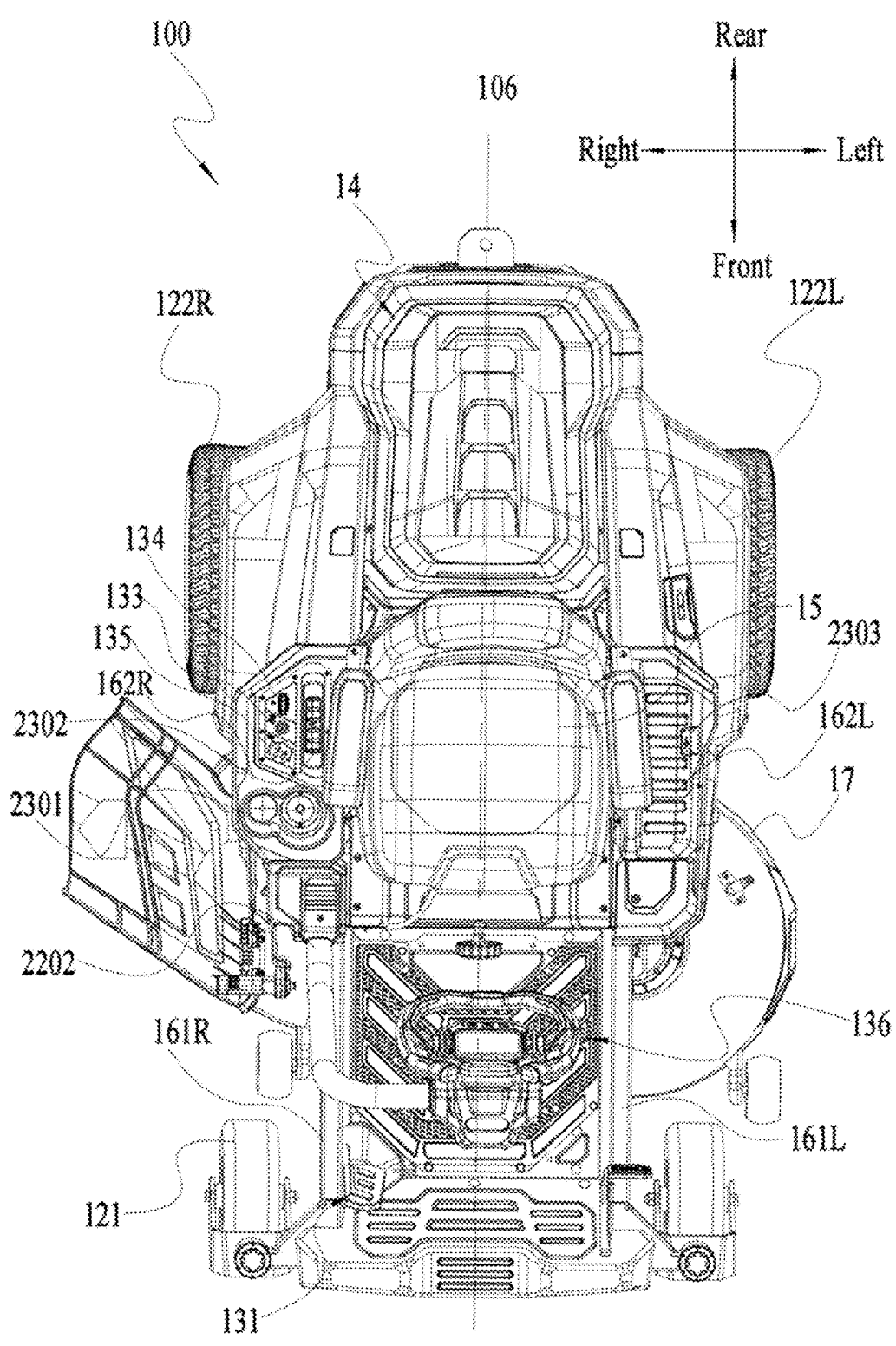
FIG. 4 is a top view of the riding lawn mower in FIG. 1.

The cutting assembly 11 includes a cutting member 111, such as, for example, a blade, for realizing a cutting function. The cutting assembly 11 is mounted to the chassis 16, under the deck 17. In other words, the deck 17 forms a semi-opening accommodating cavity to accommodate the cutting member. The cutting assembly 11 further includes a cutting motor 112 for driving the cutting member 111 to rotate. The cutting assembly 11 may include more than one cutting members 111 and more than one cutting motors 112. As shown in FIG. 4, in one example, the riding lawn mower 100 includes two cutting members 111 and two cutting motors 112. The deck 17 forms two accommodating cavities to accommodate the two cutting members 111, respectively. The cutting motors 112 are controlled by a cutting control module. In some examples, the cutting control module includes a control chip, such as MCU, ARM, and so on.

The walking assembly 12 is configured to enable the riding lawn mower 100 to walk on the ground. The walking assembly 12 may include at least one first walking wheel 121 and at least one second walking wheel 122, for example, two second walking wheels 122, namely a left second walking wheel 122L and a right second walking wheel 122R. The first walking wheel 121 is configured to rotate freely. The first walking wheel 121 has a first diameter; the second walking wheel 122 has a second diameter larger than the first diameter. The walking assembly 12 may also include at least one walking motor 123, for example, two walking motors 123, namely a left walking motor 123L and a right walking motor 123R, for driving the second walking wheel 122. In this way, when the two walking motors 123 drive the corresponding second walking wheels 122 to rotate at different speeds, a speed difference is generated between the two second walking wheels 122, so as to steer the riding lawn mower 100. The walking motor 123 is controlled by a walking control module 124. In some examples, the walking control module 124 includes a control chip, such as MCU, ARM, and so on. In one example, two walking control modules 124 control the two walking motors 123, respectively.

The power supply assembly 14 is configured to supply electric power to the riding lawn mower 100. The power supply assembly 14 is configured to at least supply electric power to the cutting motors 112 and the walking motors 123. The power supply assembly 14 may also supply electric power to other electronic components in the riding lawn mower 100, such as the cutting control module 113 and the walking control module 124. The power supply assembly 14 may also supply electric power to a lighting assembly 18. In some examples, the power supply assembly 14 is provided on the rear side of the seat 15 on the chassis 16. In some examples, the power supply assembly 14 includes a plurality of battery packs 141 capable of supplying electric power to the riding lawn mower 100.

In one construction, the power supply assembly 14 includes six battery packs 141, and the six battery packs 141 are disposed on the rear side of the seat 15. The six first battery packs 141 are arranged in a battery pack compartment 142 on the rear side of the seat 12. Further, the battery pack compartment 142 is divided into six sub battery pack compartments 143, into which the six battery packs 141 are mounted. More specifically, the six battery packs 141 are arranged in three rows and two columns. The dimension of the battery pack 141 in the left and right direction is greater than the dimension of the battery pack 141 in the front and rear direction. Thus, the dimension of the six battery packs 141 in three rows and two columns is not too large in the front and rear direction so as not to increase the size of the riding lawn mower 100 in the front and rear direction, and not too small in the left and right direction so as to effectively utilize the space occupied by the riding lawn mower 100 in the left and right direction. Thereby, the power supply assembly 14 provides enough battery capacity for powering the riding lawn mower 100, and the arrangement of the power supply assembly 14 is reasonable and space-saving. Other constructions may also be adopted if appropriate.

The operating assembly 13 is operable by the user, and the user sends control instructions through the operating assembly 13 to control the operation of the riding lawn mower 100. The operating assembly 13 can be operated by the user to set the cutting speed, walking speed, walking direction, etc. of the riding lawn mower 100. In other words, the operating assembly 13 can be operated by the user to set an operating status for the riding lawn mower 100, wherein the operating status includes a cutting status and a walking status.

The operating assembly 13 may include at least one switch triggerable to change its state so as to set the riding lawn mower 100 in different status. In one example, a seat switch (not shown) arranged under the seat 15 is configured to set the riding lawn mower 100 in a bootable state when the user is sitting on the seat, and set the riding lawn mower 100 in a non-bootable state when no one is sitting on the seat. A start button 133 is configured to start the riding lawn mower 100 when the user presses the start button 133, and stop the riding lawn mower 100 when the user presses the start button 133 again. A key switch 134 is configured to start the walking motor 123 when the user inserts a key and rotates the key to the on position, and stop the walking motor 123 when the user rotates the key to the off position or pulls the key out. A blade actuator 135 is configured to make the cutting member 111 rotate when the user lifts the blade actuator 135 up and stop the cutting member 111 when the user presses the blade actuator 135 down. The start button 133, the key switch 134, and the blade actuator 135 may be arranged on the left cover member 162L or the right cover member 162R so that they are easily reachable by the user's hand when the user is sitting on the seat 15. In one example, the start button 133 and the key switch 134, and the blade actuator 135 are all arranged on the right cover member 162R, and the left cover member 162L is left blank so that the user can rest one hand on the left cover member 162L when the user hops onto the riding lawn mower 100 from the left side of the riding lawn mower 100.

The operating assembly 13 may further include a combination of one or more operating mechanisms such as pedal, lever, handle, and steering wheel. In one example, a pedal assembly 131 combined with a steering wheel assembly 136 is configured to set up a system for the user to control at least the walking function of the riding lawn mower 100. The pedal assembly 131 controls the walking speed of the riding lawn mower 100 and the steering wheel assembly 136 controls the walking direction of the riding lawn mower 100.

The steering wheel assembly provided in this present application makes a smaller packing dimension during transportation and storage of the riding lawn mower, allows the user to hop on and off the riding lawn mower more easily and to have a larger visibility area when sitting on the riding lawn mower. The steering wheel assembly provided in this present application also improves the functional safety of operating members and the anti-fogging effect of the display interface.

Figure 2:
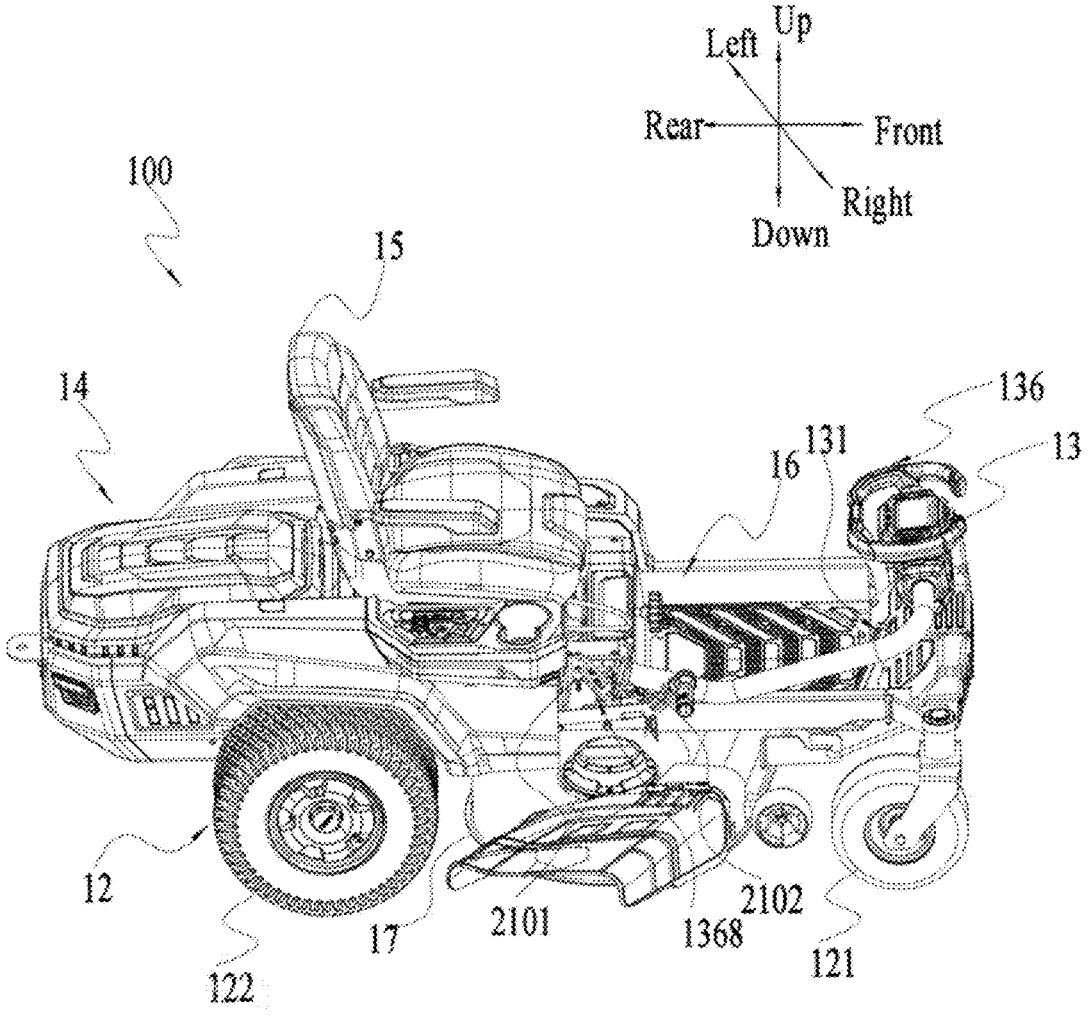
FIG. 2 is a perspective view of the riding lawn mower in FIG. 1 in a storage position, with a right cover member removed.
Figure 5:
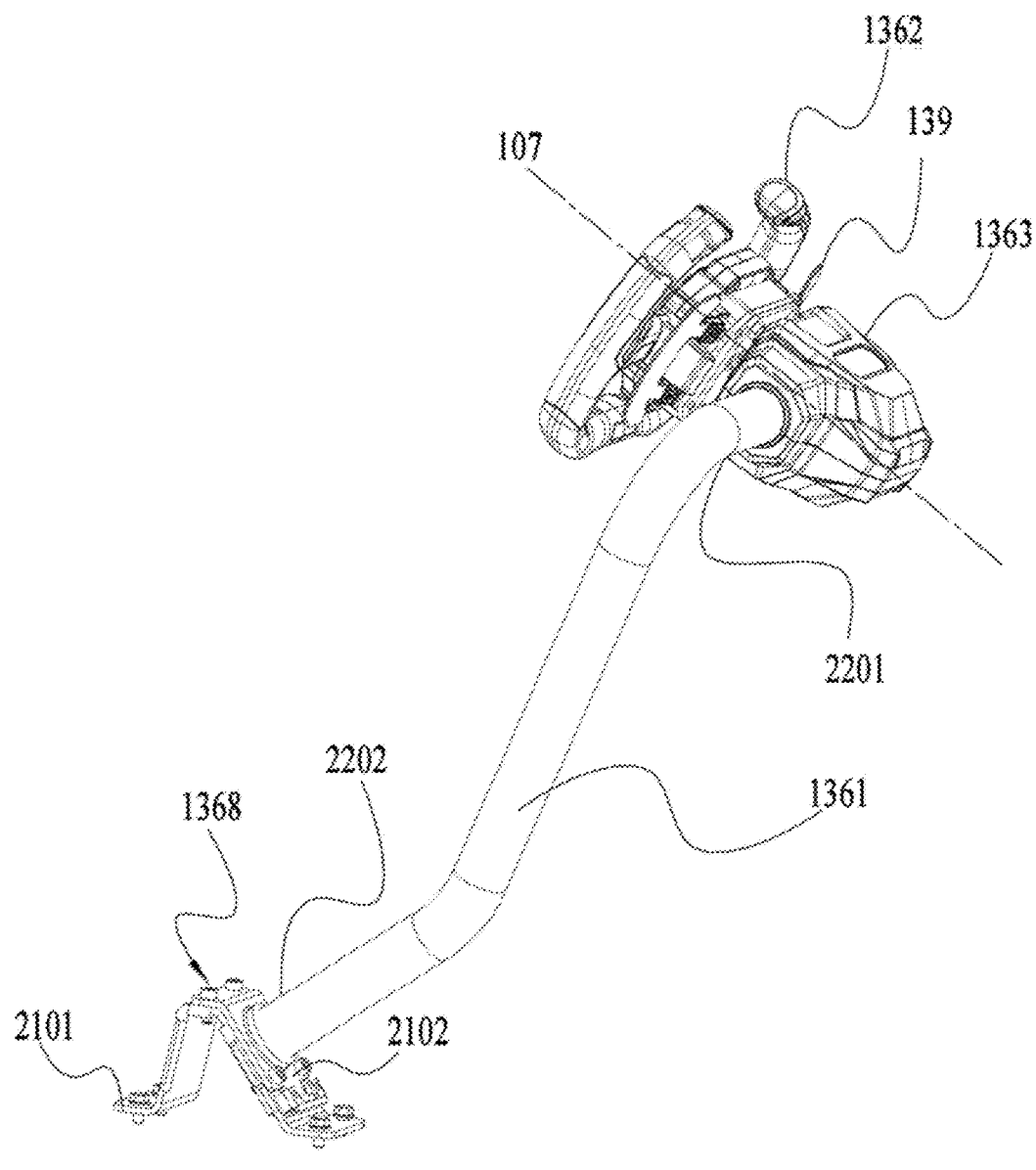
FIG. 5 is a perspective view of a steering wheel assembly of the riding lawn mower in FIG. 1.

In one example, the steering wheel assembly 136 includes a steering wheel 1362 operable to rotate about a first axis 107 and a connecting rod 1361 configured to connect the steering wheel 1362 and the chassis 16. The connecting rod 1361 has a first end 2201 connected with the steering wheel 1362 and a second end 2202 connected with the chassis 16. In one example, the steering wheel assembly 136 further includes a pivot assembly 1368 that rotatably connects the connecting rod 1361 and the chassis 16. In one example, the pivot assembly 1368 rotatably connects the second end 2202 of the connecting rod 1361 to the chassis. Referring to FIGS. 2 and 5, the pivot assembly 1368 includes a first part 2101 fixedly connected with the chassis, and a second part 2102 fixedly connected with the second end 2202 of the connecting rod 1361. The first part 2101 and the second part 2102 are movably connected with each other, for example, through a hinge structure. Thereby, the pivot assembly 1368 enables the steering wheel assembly 136 to switch between a working position and a storage position. It should be understood that, the pivot assembly 1368 may also be provided in other portions of the connecting rod 1361 to make at least part of the connecting rod 1361 rotatable, thereby achieving the same function that the steering wheel assembly 136 is switchable between a working position and a storage position.

As shown in FIG. 1, in the working position, the connecting rod 1361 is erected, lifting the steering wheel 1362 up, so that when the user is sitting up straight on the seat, the user holds the steering wheel 1362 with both hands comfortably. As shown in FIG. 2, in the storage position, the connecting rod 1361 is lied down on the chassis 16, so that during storage and transportation, the riding lawn mower 100 takes up less space. The distance between the steering wheel 1362 and the plane on which the riding lawn mower 100 walks when the steering wheel assembly 136 is in the storage position is smaller than the distance between the steering wheel 1362 and the plane when the steering wheel assembly 136 is in the working position. As shown in FIG. 5, in one construction, to secure the steering wheel assembly 136 in the working position, the first part 2101 and the second part 2102 of the pivot assembly 1368 are fixed to each other through at least one fastener, such as, for example, four long bolts. As shown in FIG. 2, in one construction, to make the steering wheel assembly 136 in the storage position, the at least one fastener is released so that the first part 2101 and the second part 2102 of the pivot assembly 1368 can rotate relative to each other. It is noted that, the transformation of the steering wheel assembly 136 between the storage position and the working position is not very swift, because such transformation is not often required, and the disclosed structure makes the connection between the second end 2202 of the connecting rod 1361 and the chassis 16 stable and secure, improving the mechanical reliability of the steering wheel assembly 136. Besides, the disclosed structure also has low production cost and low maintenance cost.

In some examples, the pedal assembly 131 and the second end 2202 of the connecting rod 1361 are located on a same side of the central vertical plane 109 that passes through the central axis 106 of the riding lawn mower 100. In one construction, to accommodate the driving habit of most users, the pedal assembly 131 is arranged on the right side of the central vertical plane 109 so that the user can operate the pedal assembly 131 without an effort. At this time, the second end 2202 of the connecting rod 1361 is also arranged on the right side of the central vertical plane 109. In one example, the connecting rod 1361 is arranged on the right side of the central vertical plane 109. In one example, the second end 2202 of connecting rod 1361 is mounted to the right side of the riding lawn mower 100. In one example, the second end 2202 of connecting rod 1361 is connected with the pivot assembly 1368 and the pivot assembly 1368 is mounted to the right longitudinal beam 161R of the chassis 16. Aligning the pedal assembly 131 and the second end 2202 of the connecting rod 1361 on the same side of the central vertical plane 109 makes the other side of the central vertical plane 109 clean, so that the user encounters fewer obstacles when hopping on the riding lawn mower 100 from the other side of the central vertical plane 109. In addition, the connecting rod 1361 provides some sort of protection for the user's foot reaching out to the pedal assembly 131.

In one example, a cover piece covers the pivot assembly 1368 when the steering wheel assembly 136 is in the working position. In one example, the right cover member 162R covers the pivot assembly 1368. In some examples, the left cover member 162L and the right cover member 162R have a similar height to a sitting surface of the seat 15; In one example, the left cover member 162L and the right cover member 162R have a lower height to the sitting surface of the seat 15. Besides the covering function, the left cover member 162L and the right cover member 162R may support at least one of operating members or accessories, which are easily accessed by the user's hands when the user is sitting on the seat 15. In one example, the left cover member 162L or the right cover member 162R may provide a cup holder 2301 to accommodate the user's cup; the left cover member 162L or the right cover member 162R may provide a cell phone holder 2302 to accommodate the user's cell phone; the left cover member 162L or the right cover member 162R may provide a charging port 2303 to charge the user's electronic devices, such as the cell phone, on the go. The left cover member 162L and the right cover member 162R may further provide triggers, switches, or buttons, i.e., members of the operating assembly 13, to allow the user to manipulate the riding lawn mower 100 more conveniently.

Figure 18:
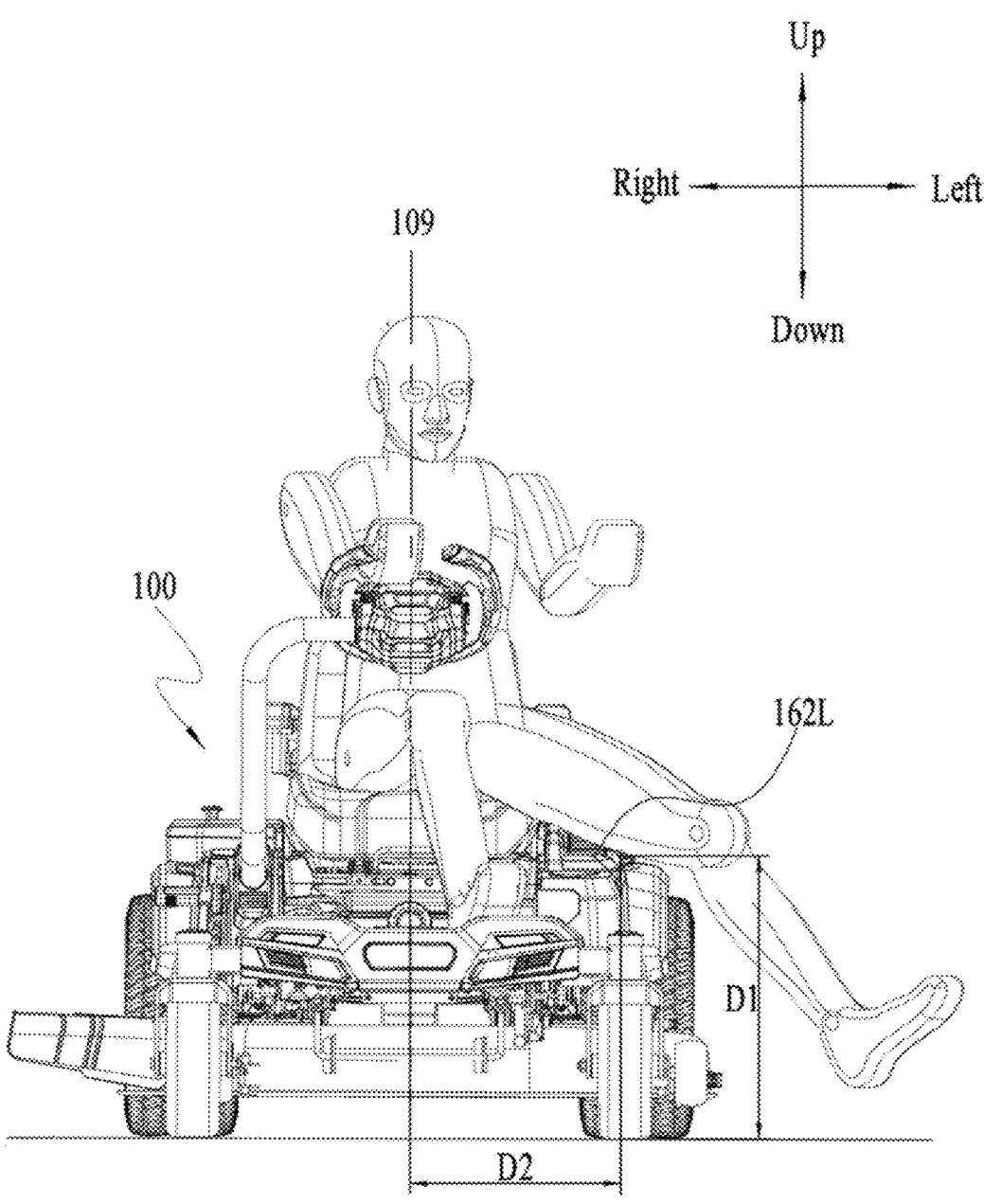
FIG. 18 is a front view of the riding lawn mower of FIG. 1 with a user on it.

In some examples, the left cover member 162L and the right cover member 162R are not symmetrical. As discussed before, the user may prefer to hop onto the riding lawn mower 100 from one side, i.e., the left side of the riding lawn mower 100, due to the obstacle of the operating assembly 13 on the other side of the riding lawn mower 100, i.e., the connecting rod 1361 of the steering wheel assembly 136 on the right side of the riding lawn mower 100. Therefore, the left cover member 162L has a lower height than the right cover member 162R. However, the height of the left cover member 162L shall not be too low for balancing the overall structure of the riding lawn mower 100. Referring to FIG. 18, in one example, the perpendicular distance D1 from the left cover member 162L to the plane on which the riding lawn mower 100 walks is greater than or equal to 45 cm and less than or equal to 65 cm. In one example, the perpendicular distance D1 from the left cover member 162L to the plane on which the riding lawn mower 100 walks is greater than or equal to 50 cm and less than or equal to 60 cm. In one example, the perpendicular distance D1 from the left cover member 162L to the plane on which the riding lawn mower 100 walks is about 55 cm. In one example, the left cover member 162L has an oblique top surface, that is, the height of the front side of which is lower than the height of the rear side of the same, making the overall height of the left cover member 162L lower than that of the right cover member 162R. In this way, the user can hop onto the riding lawn mower 100 from the left side of the riding lawn mower 100 more obstacle-free.

Figure 19:
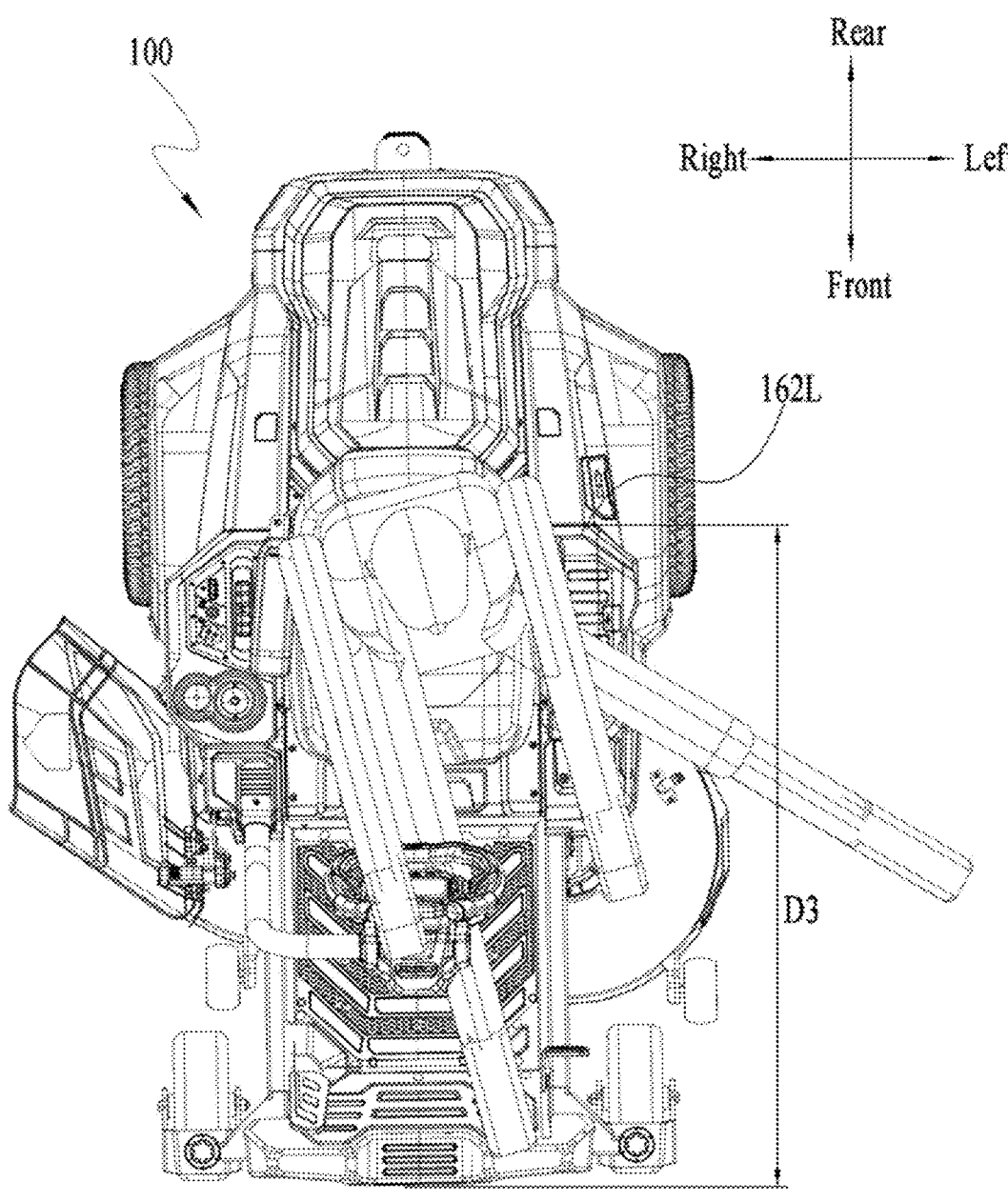
FIG. 19 is a top view of the riding lawn mower of FIG. 1 with a user on it.
Figure 20:
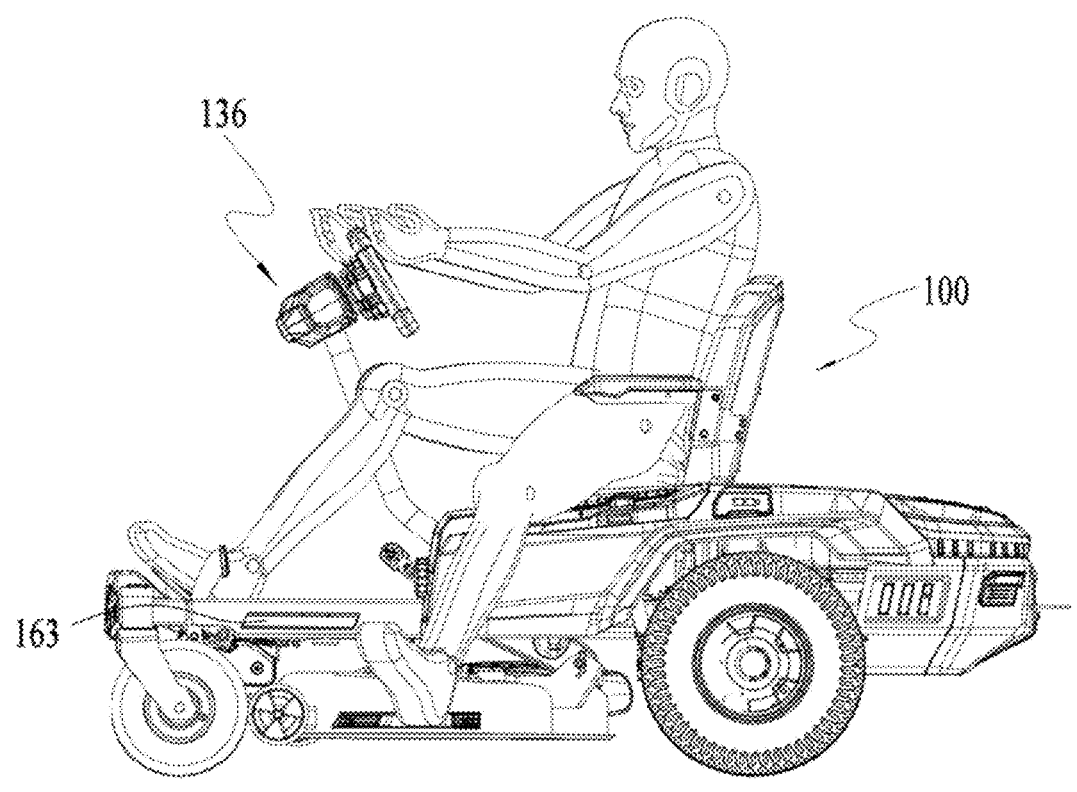
FIG. 20 is a side view of the riding lawn mower of FIG. 1 with a user on it.

Further, reducing the distance that the user needs to cross before the user gets seated may also ease the difficulty in getting onto the riding lawn mower 100, while not sacrificing the width of the riding lawn mower 100. In one example, the perpendicular distance D2 from the outermost surface of the left cover member 162L to the central vertical plane 109 is greater than or equal to 30 cm and less than or equal to 50 cm. In one example, the perpendicular distance D2 from the outermost surface of the left cover member 162L to the central vertical plane 109 is greater than or equal to 30 cm and less than or equal to 50 cm. In one example, the perpendicular distance D2 from the outermost surface of the left cover member 162L to the central vertical plane 109 is greater than or equal to 35 cm and less than or equal to 45 cm. In one example, the perpendicular distance from the outermost surface of the left cover member 162L is about 39 cm. Also, for users with taller heights and longer legs, the area that the user gets on and off the riding lawn mower 100 should be wide enough. Referring to FIG. 19, in one example, the distance D3 between orthographic projections of the front end of the riding lawn mower 100 and the rear end of the left cover member 162L on the plane on which the riding lawn mower 100 walks is greater than or equal to 100 cm and less than or equal to 130 cm. In one example, the distance D3 between orthographic projections of the front end of the riding lawn mower 100 and the rear end of the left cover member 162L on the plane on which the riding lawn mower 100 walks is greater than or equal to 110 cm and less than or equal to 120 cm. In one example, the distance D3 between orthographic projections of the front end of the riding lawn mower 100 and the rear end of the left cover member 162L on the plane on which the riding lawn mower 100 walks is about 115 cm. FIGS. 18-20 show a user 1.9 m tall; for users with lower heights or shorter legs, the area that the user gets on and off the riding lawn mower 100 is more spacious.

To further assist the user in getting onto the riding lawn mower 100, in some examples, as shown in FIG. 20, the riding lawn mower 100 further includes a step bar 163 mounted to the chassis 16, wherein the step bar 163 is located on an opposite side of central vertical plane 109 to the pedal assembly. In one example, the steering wheel assembly 136 and the pedal assembly are mounted to the left side of the riding lawn mower 100, whereas step bar 163 is mounted to the right side of the riding lawn mower 100. In one example, the step bar 163 is mounted to the right longitudinal beam 161R. In one example, the step bar 163 is foldable; specifically, the step bar 163 is rotatably mounted to the right longitudinal beam 161R through a hinge structure. The step bar 163 has a first position and a second position: in the first position, the step bar 163 is parallel to the chassis, wherein the step bar 163 extends out from the right longitudinal beam 161R, the user can step on the step bar 163 when getting onto the riding lawn mower 100; in the second position, the step bar 163 is perpendicular to the chassis, wherein the step bar 163 clings to the right longitudinal beam 161R to save space.

In one example, the operating assembly 13 further includes a control panel 137. The control panel 137 may include a plurality of buttons, wherein different buttons correspond to different commands. The buttons of the control panel 137 may include a lighting button configured to enable or disable the lighting assembly 18, a mode button configured to select and set a driving mode of the riding lawn mower 100, a configuration button configured to modify the various settings of the riding lawn mower 100, and a speed regulator button to increase or decrease the walking or cutting speed of the riding lawn mower 100. The operating assembly 13 may also include a display interface 138, which displays the operating status of the riding lawn mower 100. The display interface 138 can display the walking speed of the walking assembly, the rotational speed of the cutting assembly, the energy efficiency status of the riding lawn mower 100, the remaining capacity of the power supply assembly 14, warning information, fault information, and so on.

Figure 6:
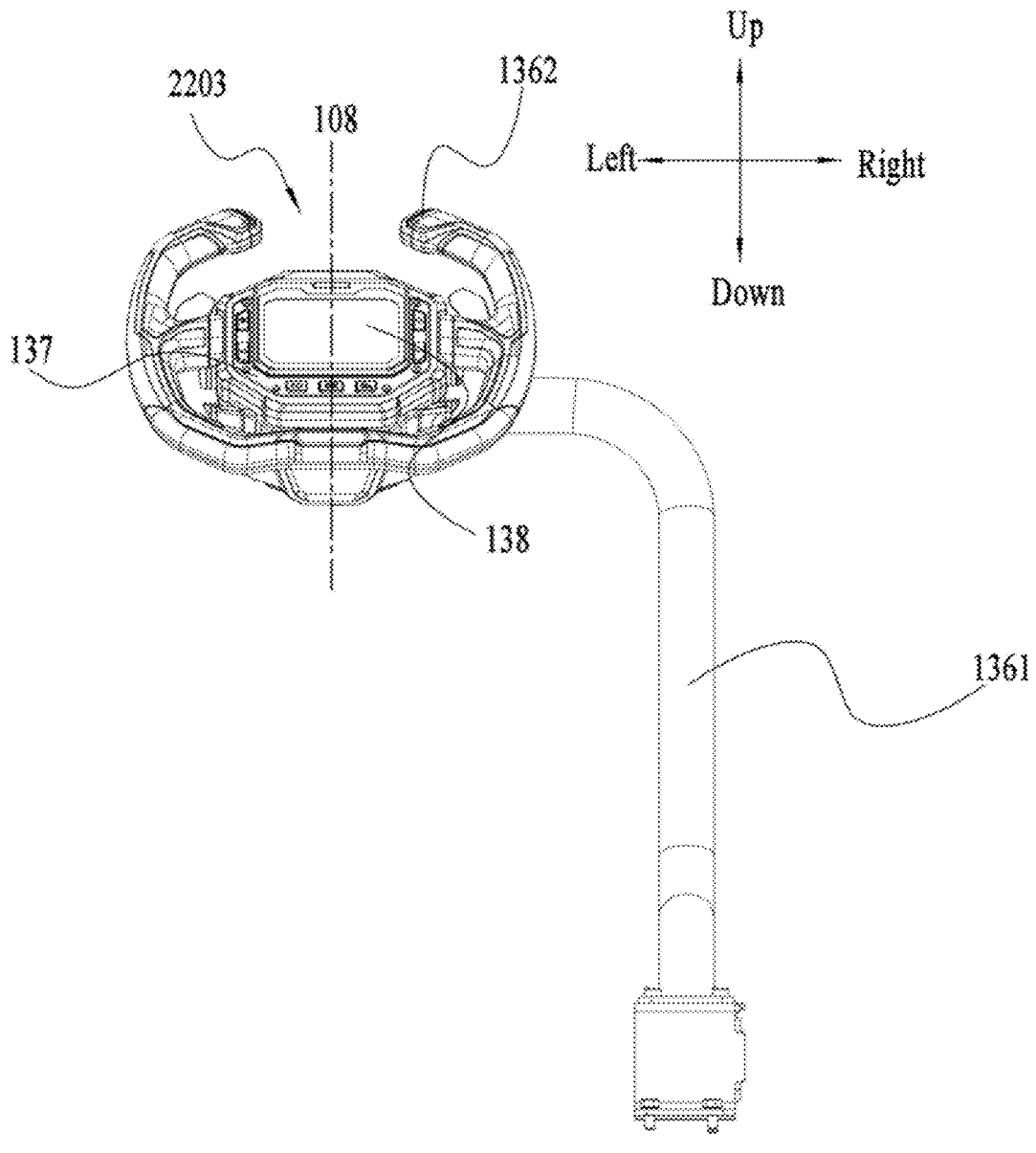
FIG. 6 is a front view of the steering wheel assembly in FIG. 5.

In one construction, the control panel 137 and the display interface 138 are integrated with the steering wheel assembly 136. Referring to FIG. 6, the control panel 137 is arranged in the centre of the steering wheel 1362, and the display interface 138 is arranged in the center of the control panel 137. In one construction, the steering wheel 1362 is substantially symmetrical about a second axis 108; the control panel 137 is also substantially symmetrical about the second axis 108; the display interface 138 is also substantially symmetrical about the second axis 108. In one construction, the buttons of the control panel 137 are distributed around the display interface 138. In one construction, the display interface 138 is substantially rectangular, the size L2 of the display interface 138 in the length direction is greater than or equal to 100 mm and less than or equal to 150 mm, and the size L3 of the display interface 138 in the width direction is greater than or equal to 60 mm and less than or equal to 90 mm. The area of the display interface 138 is greater than or equal to 70 square centimeters and less than or equal to 110 square centimeters. In this way, the size of the display interface 138 is large enough to display enough information, and at the same time, small enough to fit in the center of the control panel 137, which fit in the center of the steering wheel 1362. In one example, the display interface 138 may also be an interactive display interface, which is enabled to receive user instructions. The user inputs different control commands through the control panel 137 and/or the display interface 138 to control the walking and cutting function of the riding lawn mower 100.

Referring to FIG. 6, rather than a traditional circle steering wheel 1362, the outer frame of the steering wheel 1362 is more of the shape of an oval. In this way, on the one hand, the outer frame of the steering wheel 1362 surrounds the rectangular display interface 138 or the control panel 137 more evenly, leaving a generally equal distance between the outer frame of the steering wheel 1362 and the control panel 137, thereby providing the user with more choices on which portion of the steering wheel 1362 to grip or hold. On the other hand, unlike a circle, an oval does not have uniform diameters, so the outer frame of the steering wheel 1362 has a larger dimension defined as its width and a smaller dimension defined as its height. The larger dimension allows a generous width of the steering wheel 1362 so that the user holds the steering wheel 1362 with both hands more comfortably; the smaller dimension allows a lower height of the steering wheel 1362 so that a clearer view is left for the user to observe the environment.

Further, the steering wheel 1362 is formed with a gap 2203 on the top side of the steering wheel 1362, wherein the gap 2203 is also substantially symmetrical about the second axis 108. The gap 2203 further removes obstacles in the user's sight, leaving user's sight unblocked. The outer frame of the steering wheel 1362 is disconnected due to the gap 2203, and the disconnected ends are shaped for the user to grip. In one example, the gap 2203 can be replaced by a transparent portion. That is, the outer frame of the steering wheel 1362 is still continuous, but the top side of the steering wheel 1362 is made of transparent materials. In one example, the length of the gap 2203 or the transparent portion is greater than or equal to $\frac{1}{10}$ of a perimeter of the steering wheel 1362 and less than or equal to $\frac{1}{2}$ of the perimeter of the steering wheel 1362. In one example, the length of the gap 2203 or the transparent portion is greater than or equal to $\frac{1}{5}$ of a perimeter of the steering wheel 1362 and less than or equal to $\frac{1}{3}$ of the perimeter of the steering wheel 1362.

Figure 21:
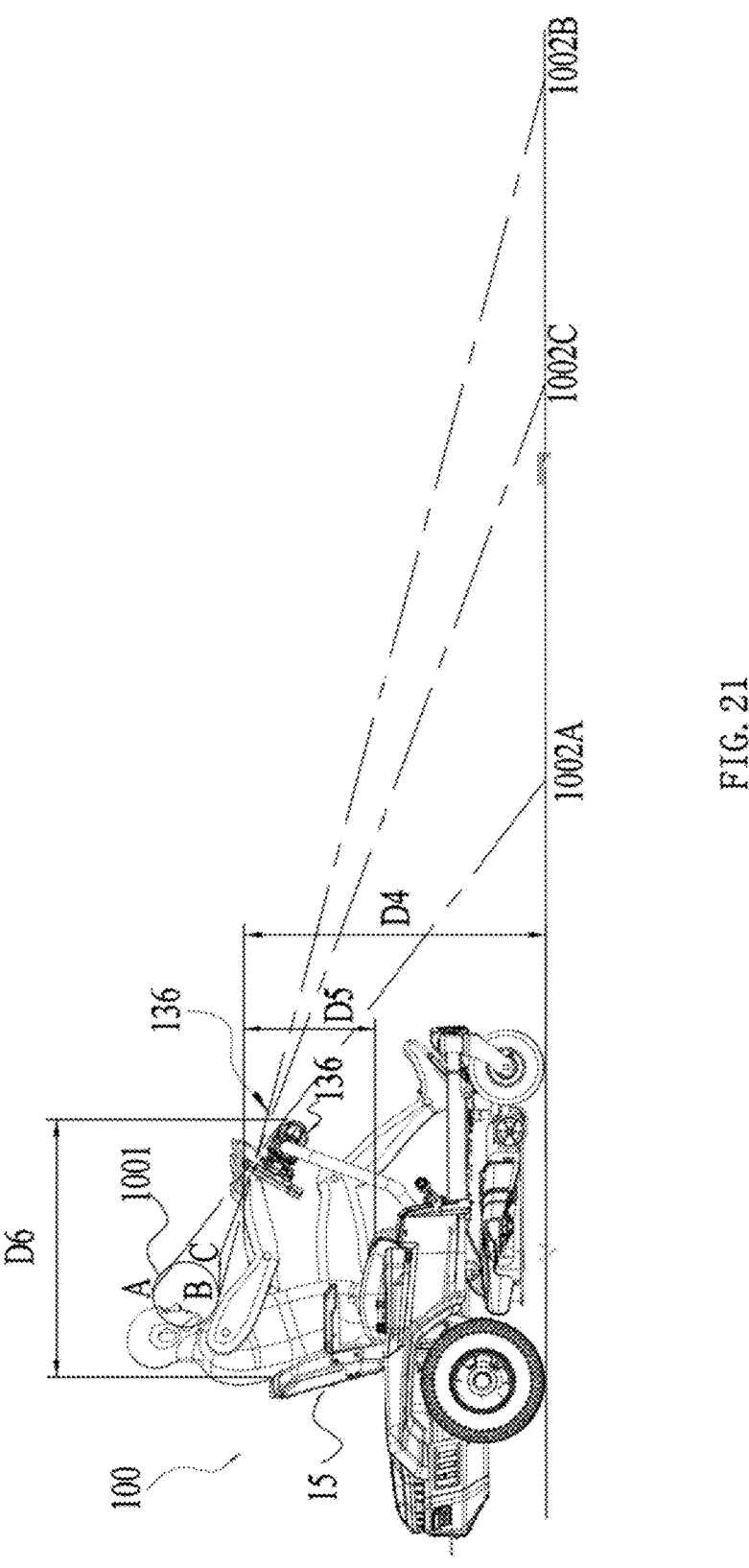
FIG. 21 is a schematic diagram of users' line of sight when sitting on the riding lawn mower of FIG. 1.

In order to further enlarge the view of the user, the position of the steering wheel assembly 136 in the working position is carefully designed. Referring to FIG. 21, the height of the steering wheel assembly 136 may be defined as the perpendicular distance D4 from a highest point of the steering wheel assembly 136 to the plane on which the riding lawn mower 100 walks. The lower the height of the steering wheel assembly 136, the better the view of the user, however, when the height of the steering wheel assembly 136 is too low, the operating experience of the steering wheel assembly 136 may suffer. In one example, when the steering wheel assembly 136 is in the working position, the perpendicular distance D4 from a highest point of the steering wheel assembly 136 to the plane on which the riding lawn mower 100 walks is greater than or equal to 85 cm and less than or equal to 125 cm. In one example, when the steering wheel assembly 136 is in the working position, the perpendicular distance D4 from a highest point of the steering wheel assembly 136 to the plane on which the riding lawn mower 100 walks is greater than or equal to 95 cm and less than or equal to 115 cm. In one example, when the steering wheel assembly 136 is in the working position, the perpendicular distance D4 from a highest point of the steering wheel assembly 136 to the plane on which the riding lawn mower 100 walks is about 105 cm.

Similarly, the difference of the height of the steering wheel assembly 136 and the height of the sitting surface of the seat, i.e., the height difference of the steering wheel assembly 136 and the sitting surface of the seat, also affects user's view. The smaller the height difference, the better the view of the user, however, when the height difference is too small, the legroom may be insufficient, causing an uncomfortable sitting experience. In one example, when the steering wheel assembly 136 is in the working position, the difference D5 of a perpendicular distance from a highest point of the steering wheel assembly 136 to the plane on which the riding lawn mower 100 walks and a perpendicular distance from the sitting surface of the seat to the plane on which the riding lawn mower 100 walks is greater than or equal to 30 cm and less than or equal to 55 cm. In one example, when the steering wheel assembly 136 is in the working position, the difference D5 of a perpendicular distance from a highest point of the steering wheel assembly 136 to the plane on which the riding lawn mower 100 walks and a perpendicular distance from the sitting surface of the seat to the plane on which the riding lawn mower 100 walks is greater than or equal to 35 cm and less than or equal to 50 cm. In one example, when the steering wheel assembly 136 is in the working position, the difference D5 of a perpendicular distance from a highest point of the steering wheel assembly 136 to the plane on which the riding lawn mower 100 walks and a perpendicular distance from the sitting surface of the seat to the plane on which the riding lawn mower 100 walks is about 42 cm.

Further, the distance between the steering wheel assembly 136 and a back of the seat may also affect the user's view, assuming that the user sits back when operating the riding lawn mower 100. The closer the distance between the steering wheel assembly 136 and the back of the seat, the better the view of the user, however, if the distance between the steering wheel assembly 136 and the back of the seat is too small, either the sitting area of the seat is too small or the steering wheel assembly 136 is too close to the user's chest, causing an uncomfortable sitting experience or operating experience of the steering wheel assembly 136. In one example, when the steering wheel assembly 136 is in the working position, the distance D6 between orthographic projections of the steering wheel assembly 136 and the back of the seat on the plane on which the riding lawn mower 100 walks is greater than or equal to 60 cm and less than or equal to 100 cm. In one example, when the steering wheel assembly 136 is in the working position, the distance D6 between orthographic projections of the steering wheel assembly 136 and the back of the seat on the plane on which the riding lawn mower 100 walks is greater than or equal to 70 cm and less than or equal to 90 cm. In one example, when the steering wheel assembly 136 is in the working position, the distance D6 between orthographic projections of the steering wheel assembly 136 and the back of the seat on the plane on which the riding lawn mower 100 walks is 80 cm.

In an example, the seat 15 is adjustable in the front and back direction of the riding lawn mower 100. An eye position scope 1001 is depicted in FIG. 21 to represent the possible eye positions of users of different heights. The user depicted in FIG. 21 is 1.9 m tall, so his eyes are located in the upper portion of the eye position scope. The eyes of a tall user may be located in point A, thus the line of sight from point A is 1002A, and the user is able to observe the area further than 1002A, leaving the area between 1002A and the riding lawn mower 100 the blind area. The eyes of a short user may be located in point B, thus the line of sight from point B is 1002B, and the user is able to observe the area further than 1002B, leaving the area between 1002B and the riding lawn mower 100 the blind area. The blind area of a short user is larger than the blind area of a tall user, that is, a tall user can observe the lawn more nearby to the riding lawn mower 100 than a short user. To alleviate this problem, the riding lawn mower 100 is further provided with an adjustment device to move the seat 15 in the front and back direction of the riding lawn mower 100. Therefore, the eyes of a short user, which originally located in point B, are moved to point C, if the user operates the adjustment device to move the seat 15 to the front. Thus the line of sight from point C is 1002C, and the user is able to observe the area further than 1002C, leaving the area between 1002C and the riding lawn mower 100, i.e., the blind area, smaller.

Figure 7:
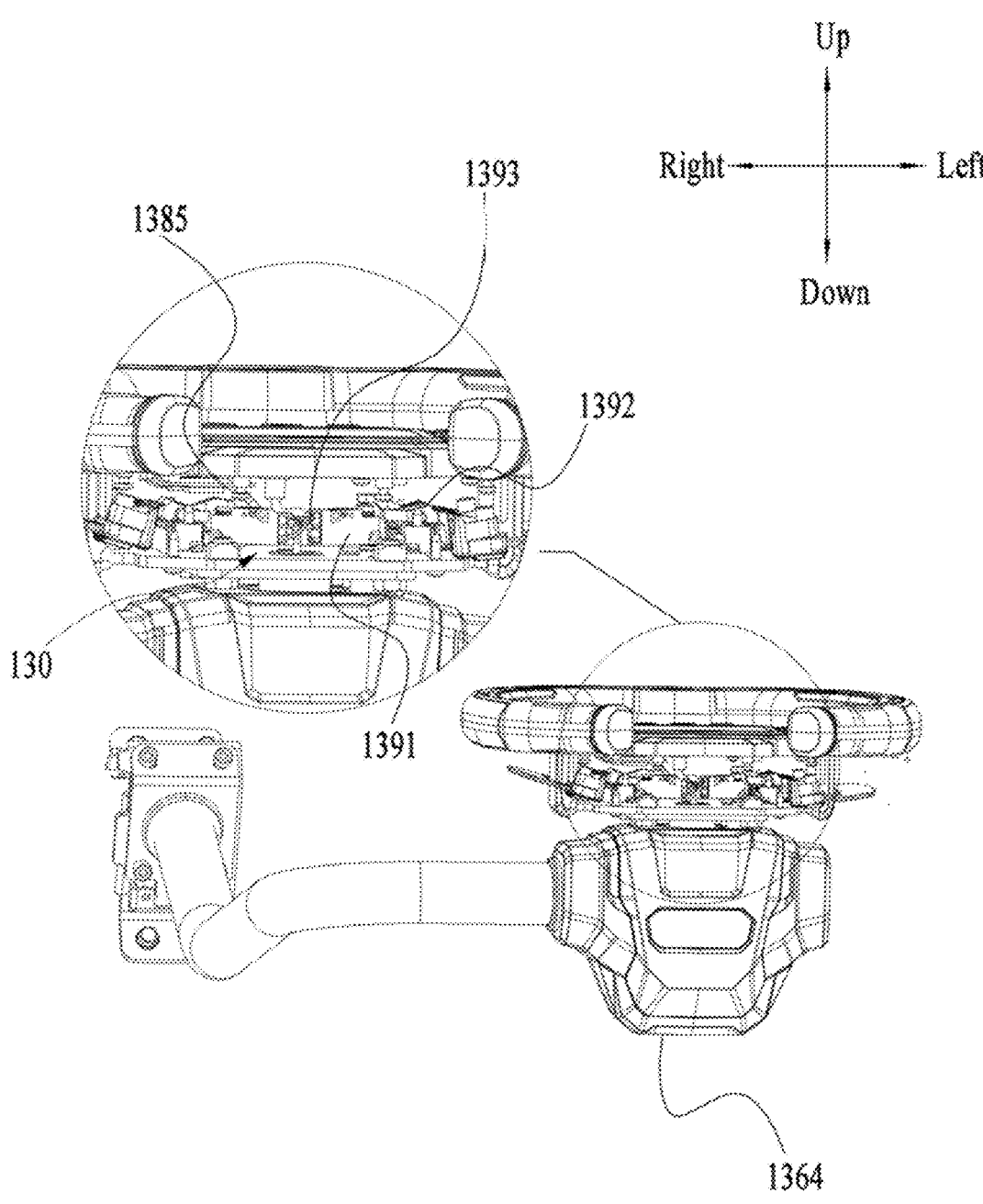
FIG. 7 is an enlarged view of a part of the structure of the steering wheel assembly in FIG. 5.

In one example, the operating assembly 13 further includes an operating member 139 operable by the user to control at least a control circuit 130 of the riding lawn mower 100. Specifically, the control circuit 130 has at least a first state 1301 that permits the walking motor 123 to start and a second state 1302 that prevents the walking motor 123 from starting. When the riding lawn mower is powered on, i.e., the key is inserted and rotated to the on position, the control circuit 130 is in the second state 1302, and the operating member 139 is operable to switch the control circuit 130 into the first state 1301. In some examples, the operating member 139 is at least one paddle shifter 139. Referring to FIGS. 5-7, the operating member 139 is a pair of paddle shifters 139, respectively a left paddle shifter 139L and a right paddle shifter 139R. The steering wheel assembly 136 further includes a mounting assembly 1363 that rotatably connects the steering wheel 1362 and the connecting rod 1361. In one construction, the paddle shifters 139 are mounted to the steering wheel 1362. In another construction, the paddle shifters 139 are mounted to the mounting assembly 1363. In one example, the left paddle shifter 139L and the right paddle shifter 139R are mounted to the casing of the control panel 137 or the display interface 138, the left paddle shifter 139L extends to the left side of the riding lawn mower 100, the right paddle shifter 139R extends to the right side of the riding lawn mower 100, so that when the user holds the steering wheel 1362 with both hands, the left paddle shifter 139L is triggerable by at least one finger of a left hand and the right paddle shifter 139R is triggerable by at least one finger of a right hand. When operating the paddle shifters 139, the user's hands don't need to leave the steering wheel 1362; therefore operations to the paddle shifters 139 are handy when the user is driving the riding lawn mower 100.

In one example, the operating member 139 is coupled to a switch 1391, the operating member 139 is operable to actuate the switch 1391; when the switch 1391 is actuated by the operating member 139, the control circuit 130 is switched into the first state 1301. Specifically, as shown in FIG. 7, the left paddle shifter 139L is coupled to a transmission lever 1392. The transmission lever 1392 has a first end 2201 coupled to left paddle shifter 139L and a second end 2202 coupled to the contact of the switch 1391, such as a snap-action switch. When the left paddle shifter 139L is pressed, the transmission lever 1392 presses the contact of the switch 1391, and the switch 1391 sends a start signal to the control circuit 130. The same structure applies to the right paddle shifter 139R.

Figure 17:
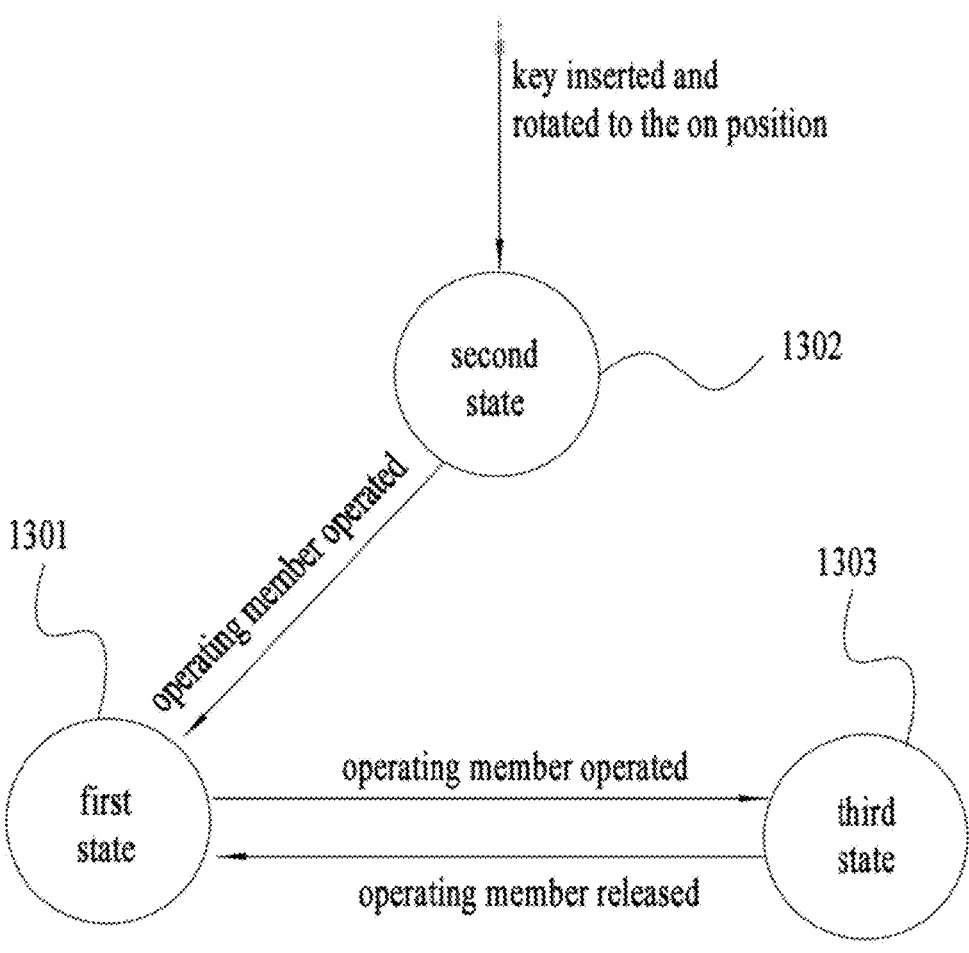
FIG. 17 is a state diagram of a control circuit of the riding lawn mower according to one example.

Referring to FIG. 17, when the riding lawn mower is powered on, for example, the key in inserted and rotated to the on position, the control circuit 130 is in the second state 1302. In one example, the control circuit 130 is switched into the first state 1301 when the user operates the operating member 139, i.e., the at least one paddle shifter 139 to send a start signal. In one example, the control circuit 130 is switched into the first state 1301 when both start signals from the left paddle shifter 139L and the right paddle shifter 139R are received. In one example, the control circuit 130 is switched into the first state 1301 when both start signals from the left paddle shifter 139L and the right paddle shifter 139R are received substantially at the same time, i.e., the time stamps of the start signals from the left paddle shifter 139L and the right paddle shifter 139R have a time difference within a certain time threshold. In one example, the riding lawn mower 100 further includes the start button 133, when the start button 133 is pressed and the switch is actuated by the operating member 139, the control circuit 130 is switched into the first state 1301. In the first state 1301, the user operates the pedal assembly 131 and the steering wheel assembly 136 to control the walking speed and the walking direction of the riding lawn mower 100 when walking forwardly.

In one example, the control circuit 130 further has a third state 1303, in which the control circuit 130 stops the walking motor 123 and then permits the walking motor 123 to rotate reversely. The operating member 139 is operable to switch the control circuit 130 into the third state 1303. When the control circuit 130 is in the first state 1301, and the at least one paddle shifter 139 remains pressed for a time period greater than or equal to a first time threshold, the control circuit 130 is switched into the third state 1303. In other words, the riding lawn mower 100 switches from walking forward to walking backward if the user presses the at least one paddle shifter for a time period greater than or equal to a first time threshold. In some cases, even if the user presses the at least one paddle shifter for a time period greater than or equal to the first time threshold, i.e., the user issues a reverse command by the operating member 139, but the riding lawn mower 100 is walking too fast for the reverse command to safely take action, then the reverse command is refused, and the display interface 138 prompts up with a warning that the riding lawn mower 100 is not allowed to reverse. Thus, in one example, when the control circuit 130 is in the first state 1301 and the at least one paddle shifter remains pressed for a time period greater than or equal to a first time threshold, the control circuit 130 determines if a rotational speed of the motor is less than or equal to a first velocity threshold, and if the rotational speed of the motor is less than or equal to the first velocity threshold, the control circuit 130 is switched into the third state 1303.

During the process of switching from the first state 1301 to the third state 1303, or in other words, from walking forward to walking backward, the riding lawn mower 100 first decelerates in the forward direction until the walking speed is 0, and then accelerates in the backward direction; that is, the control circuit 130 first decelerates the rotational speed of the walking motor 123 until the rotational speed of the walking motor 123 is 0, and then rotate the walking motor 123 reversely. In the third state 1303, the user also operates the pedal assembly 131 and the steering wheel assembly 136 to control the walking speed and the walking direction of the riding lawn mower 100 when walking reversely. It should be noted that, a maximum rotational speed of the motor when the control circuit 130 is in the third state 1303 is less than a maximum rotational speed of the motor when the control circuit 130 is in the first state 1301. In addition, a maximum turning angle of the riding lawn mower when the control circuit 130 is in the third state 1303 is less than a maximum turning angle of the motor when the control circuit 130 is in the first state 1301. As a result, the riding lawn mower 100 is not allowed to walk fast or turn sharply when walking reversely, thereby improving the safety of the riding lawn mower 100.

When the control circuit 130 is in the third state 1303 and the at least one paddle shifter 139 is released, the control circuit 130 is switched into the first state 1301. In other words, the riding lawn mower 100 switches from walking backward to walking forward if the user releases the at least one paddle shifter 139. That is, the user needs to keep pressing the at least one paddle shifter 139 when the riding lawn mower 100 walks backward. During the process of switching from the third state 1303 to the first state 1301, or in other words, from walking backward to walking forward, the riding lawn mower 100 first decelerates in the backward direction until the walking speed is 0, and then accelerates in the forward direction; that is, the control circuit 130 first decelerates the rotational speed of the walking motor 123 until the rotational speed of the walking motor 123 is 0, and then rotate the walking motor 123 forwardly.

In one example, the riding lawn mower 100 provides the user with different driving modes. In one example, the user may select the driving mode through the mode button. Different driving modes are configured with different responsiveness, thus giving the user a bunch of driving experiences to select from. In one example, the riding lawn mower 100 has a standard mode, a control mode, and a sports mode. The acceleration of the control circuit 130 switching from the first state 1301 to the third state 1303 varies across the plurality of driving modes. The sport mode is configured with the fastest acceleration among the three driving modes, and as a consequence, the sport mode switches the fastest from walking forward to walking backward or from walking backward to walking forward. The standard mode is configured with a slower acceleration than that of the sport mode, and as a consequence, the standard mode switches slower from walking forward to walking backward or from walking backward to walking forward. The control mode is configured with a slowest acceleration among the three driving modes, and as a consequence, the control mode switches the slowest from walking forward to walking backward or from walking backward to walking forward.

In the related art, gardening tools, such as riding lawn mowers on the market are prone to fogging on the display screen due to the influence of high temperature and high humidity. As a result, the user cannot observe the data or figures displayed on the display screen clearly, making the user experience bad.

Figure 13:
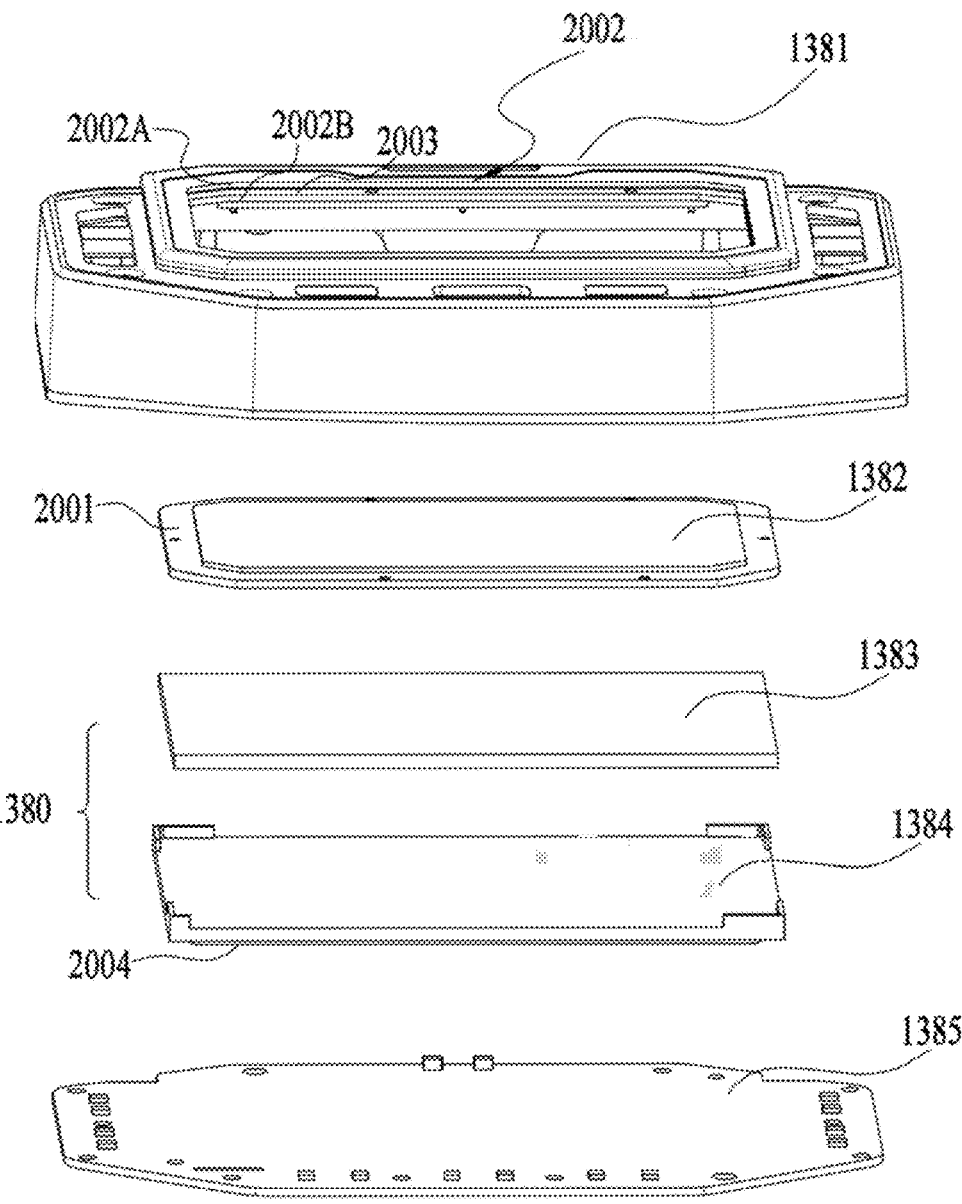
FIG. 13 is an exploded view of a display interface of the riding lawn mower according to one example.
Figure 14:
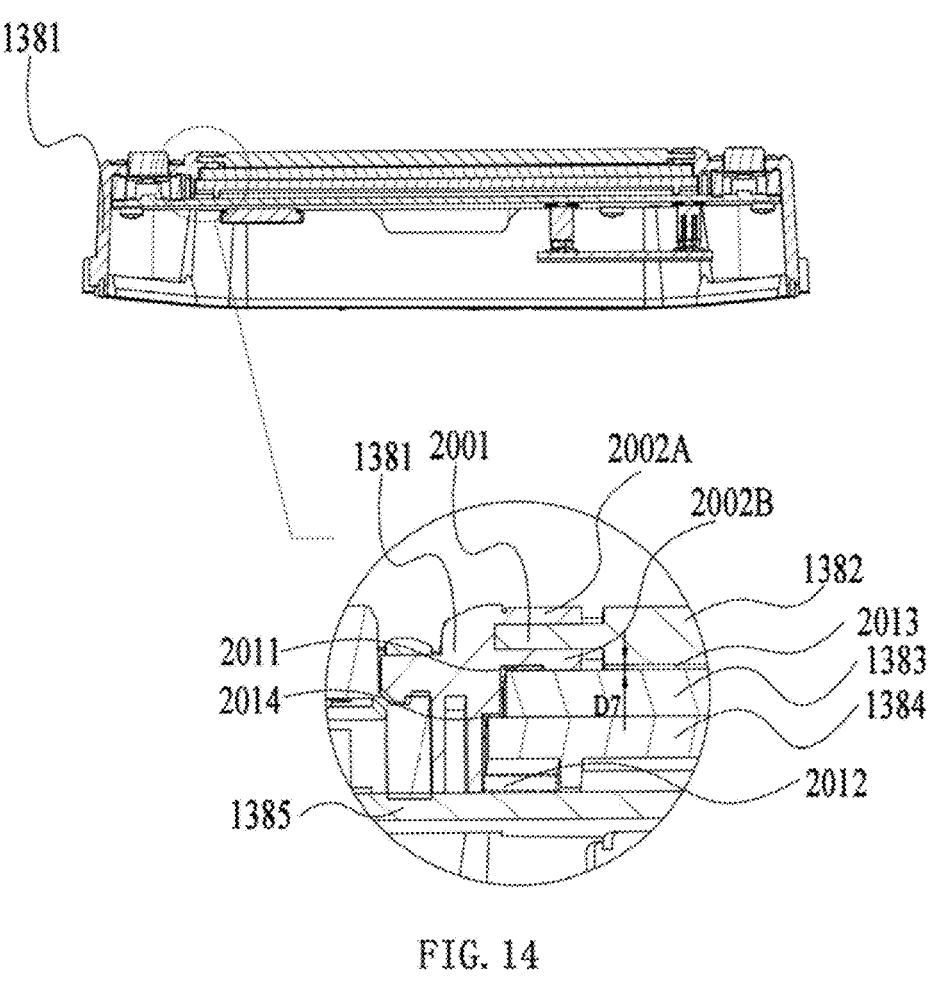
FIG. 14 is a sectional view of the display interface in FIG. 13.

Referring to FIGS. 13-14, the display interface 138 includes a casing 1381, a screen layer 1380 accommodated in the casing 1381, and a printed circuit board 1385. The screen layer 1380 may be an LCD screen or an LED screen, which is not limited herein. As detailed optical construction of the screen itself is not a contribution of this disclosure, the screen layer 1380 is simplified for the purpose of description. In one example, the screen layer 1380 includes a middle layer 1383 and a back layer 1384. The middle layer 1383 forms a light channel that guides and converts backlight. The middle layer 1383 may include an LED strip, a polarizer layer, a liquid crystal layer, a color filter layer, and a light guide plate, which are not shown in the drawings. The back layer 1384 may be a reflector sheet that reflects backlight. The backlight arrangement may be either edge LED or direct LED, which is not limited herein. The casing 1381 includes a cover layer 1382, which is a transparent protection cover, to protect and display the screen layer 1380. The cover layer 1382, the middle layer 1383, the back layer 1384, and the printed circuit board 1385 are stacked and mounted to the casing 1381, i.e., the middle layer 1383 disposed under the cover layer 1382, the back layer 1384 disposed under the middle layer 1383, and the printed circuit board 1385 disposed under the back layer 1384.

In one example, the casing 1381 of the display interface 138 includes a frame for the cover layer 1382 and a plurality of preserved openings for the buttons of the control panel 137; in other examples, the casing 1381 does not include openings for buttons or switches. In this example, the frame is integrally formed with the casing 1381; in other examples, the frame may be a separate part embedded into the casing 1381. In one example, the back layer 1384 has a rib portion 2004 projecting toward the printed circuit board 1385. The rib portion 2004 lifts the back layer 1384 up above the printed circuit board 1385; and the back layer 1384 presses the middle layer 1385 against the casing 1381. In one example, the printed circuit board 1385 is mounted to the casing 1381 through at least one fastener, such as, screw. In one example, the printed circuit board 1385 is integrated with switches for the buttons of the control panel 137, so that the printed circuit board 1385 not only transmits graphic signals for the display interface 138, but also transmits switch signals for the buttons of the control panel 137.

In one example, the cover layer 1382 is also mounted to the casing 1381. The cover layer 1382 may be made of tempered glass or transparent polycarbonate (PC) materials, while the casing 1381 is made of other materials. Both sides of the cover layer 1382 are applied with at least one coating, such as, for example, Nano coating. The Nano coating can make the cover layer 1382 water repellent and dust resistant as well, so that when the riding lawn mower 100 is working, the water and dust in the air does not pollute the display interface 138 easily, allowing the user to observe the display interface 138 clearly throughout the mowing process. In some examples, multiple layers of coatings are applied to the cover layer 1382 to ensure the effectiveness and durability of coating. Further, in some examples, at least one protection film is applied to the cover layer 1382 to avoid scratches or damages to the coating and/or the cover layer 1381.

Figure 15:
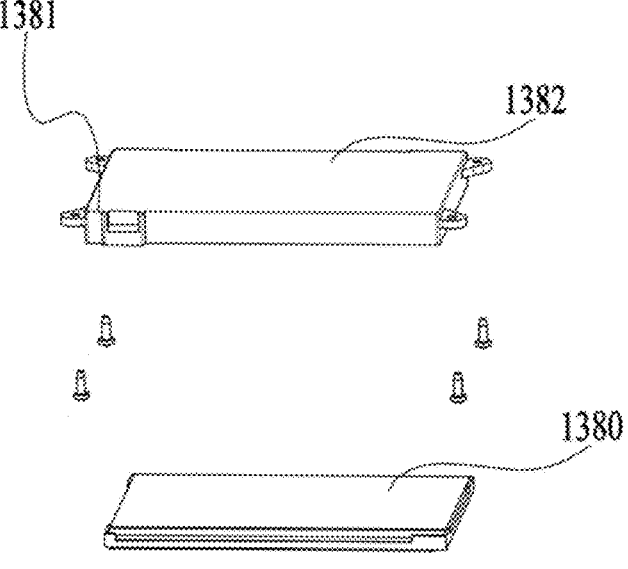
FIG. 15 is an exploded view of a display interface according to another example.

Referring to FIG. 13, the cover layer 1382 includes a projecting portion 2001 extending from its side surfaces. The casing 1381 includes a mating portion 2002 for mating with the projecting portion 2001 of the cover layer 1382. In one example, the mating portion 2002 includes two edges, respectively an upper edge 2002A and a lower edge 2002B. The upper edge 2002A and the lower edge 2002B form a groove 2003 in between. The projecting portion 2001 of the cover layer 1382 mates with the groove 2003 of the casing 1381 so as to mount the cover layer 1382 to the casing 1381. In one example, when the cover layer 1382 is embedded into the casing 1381, they are capsulated together. In another example, the casing 1381 and the cover layer 1382 is one piece, that is, the casing 1381 and the cover layer 1382 are integrated together, in one example, the casing 1381 is made of tempered glass or transparent polycarbonate (PC) materials. Referring to FIG. 15, the casing 1381 can be assembled to a gardening tool or power tool through fasteners, such as screws.

In one example, adhesives, especially flexible adhesives, such as silicone, are applied between the screen layer 1380 and the casing 1381. The flexible adhesives are able to accommodate differences in the thermal expansion coefficients of the adherends and therefore less prone to damages and aging issues. In one construction, flexible adhesives are applied to fill the space between the rib portion 2004 and an inner wall of the casing 1381 to form a seal to seal a chamber between the casing 1381 and the screen layer 1380. The chamber at least includes the space between the cover layer 1382 and the screen layer 1380. In some other constructions, the rib portion 2004 may be arranged on other positions of the screen layer 1380, for example such as, on the side surface of the screen layer 1380. It should be understood that, depending on the specific construction of the display interface 138, for example, the casing 1381, the cover layer 1382, the screen layer 1380 and so on, the specific position that the flexible adhesives are applied to may be slightly different, which is not limited herein.

In one example, double seals are created to safely seal the space between the cover layer 1382 and the screen layer 1380. As shown in FIG. 14, flexible adhesives are applied to fill the space between the lower surface of the lower edge 2002B and the upper surface of the middle layer 1383, thereby forming a first seal 2011. Further, flexible adhesives are applied to fill the space between the rib portion 2004 of the back layer 1384 and an inner wall of the casing 1381, thereby forming a second seal 2012. Depending on the specific construction of the display interface 138, for example, the casing 1381, the cover layer 1382, the middle layer 1383, the back layer 1384 and so on, the specific positions that the first seal 2011 and the second seal 2012 are applied to may be slightly different, which is not limited herein. Sealed by the first seal 2011, a first chamber 2013 is formed between the cover layer 1382 and the screen layer 1830, specifically, between the cover layer 1382 and the middle layer 1383. Sealed by the first seal 2011 and the second seal 2012, a second chamber 2014 is formed between the inner wall of the casing 1381 and side surface of the screen layer 1830, specifically, between the inner wall of the casing 1381 and the side surfaces of the middle layer 1383 and the back layer 1384. The first chamber 2013 and the second chamber 2014 abut.

To ensure the hardness of the cover layer 1382, in one construction, the thickness of the cover layer 1382 is greater than or equal to 2 mm and less than or equal to 5 mm. Or, the thickness of the cover layer 1382 is greater than or equal to 3 mm and less than or equal to 4 mm. In one example, the thickness of the cover layer 1382 is 3.5 mm. As the cover layer 1382 in this disclosure is made relatively thick, the cover layer 1382 is less prone to deformation, bending or dent. As a result, the distance D7 between the cover layer 1382 and the screen layer 1830, specifically, the distance D7 between the cover layer 1382 and the middle layer 1383, i.e., the height of the first chamber 2013, can be made relatively small. In one example, the distance D7 between the cover layer 1382 and the screen layer 1830 may be greater than or equal to 0.1 mm and less than or equal to 3 mm. Or, the distance D7 between the cover layer 1382 and the screen layer 1830 may be greater than or equal to 0.2 mm and less than or equal to 2 mm. In one example, the distance D7 between the cover layer 1382 and the screen layer 1830 is 0.3 mm.

A small distance between the cover layer 1382 and the screen layer 1830 means that the height of the first chamber 2013 is small, therefore the volume of the air sealed by the first seal 2011 in the first chamber 2013 is small. The small volume of air sealed between the cover layer 1382 and the screen layer 1830 contains little moisture, thereby less prone to liquidation, which alleviates the problem of fogging of the display interface 138. Over time, though, the anti-fogging effect depends largely on the durability of the seals, i.e., the first seal 2011 and the second seal 2012. If the seals become aged and cracked, moisture from the environment can enter the first chamber 2013, causing fogs on the display interface 138. On one hand, the first seal 2011 and the second seal 2012 provide double protection. If the second seal breaks and the first seal still functions, the first seal can still seal the first chamber; if the first seal breaks and the second seal still functions, the second seal can still seal the space of the first chamber plus the second chamber. On the other hand, the first chamber 2013 and the second chamber 2014 play a role in force balancing.

When the environment temperature changes, the air sealed in the first chamber 2013 expands if the environment temperature is high and contracts if the environment temperature is low, causing pushing force (when expending) and pulling force (when contracting) to the first seal 2011, which is damaging for the reliability and durability of the first seal 2011 over time. However, as height of the first chamber 2013 is small, the volume of the air sealed by the first seal 2011 in the first chamber 2013 is small, therefore the force applied to the first seal 2011 generated from thermal expansion and contraction of the air in the first chamber 2013 is limited. Further, there is also some air sealed in the second chamber 2014, between the inner wall of the casing 1381 and side surface of the screen layer 1830, sealed by the first seal 2011 and the second seal 2012. When the environment temperature changes, the air sealed in the second chamber 2014 also expands if the environment temperature is high and contracts if the environment temperature is low. In other words, the air sealed in the second chamber 2014 expands and contracts substantially synchronously with the air sealed in the first chamber 2013. As the first chamber 2013 and the second chamber 2014 abut and share the first seal 2011 as a common boundary, the force applied to the first seal 2011 generated from thermal expansion and contraction of the air in the second chamber 2014 at least partially offsets the force applied to the first seal 2011 generated from thermal expansion and contraction of the air in the first chamber 2013, thereby the first seal 2011 suffers from less pushing force and pulling force during temperature change, making the first seal 2011 more durable. The structure described above is simple, compact, and highly reliable, forming an independent display assembly, which is convenient for assembly, maintenance, and replacement. It is understood that, the structure is not limited to display screens on riding lawn mowers, the structure is also applicable to display screens on other power tools for anti-fogging purposes.

Figure 16:
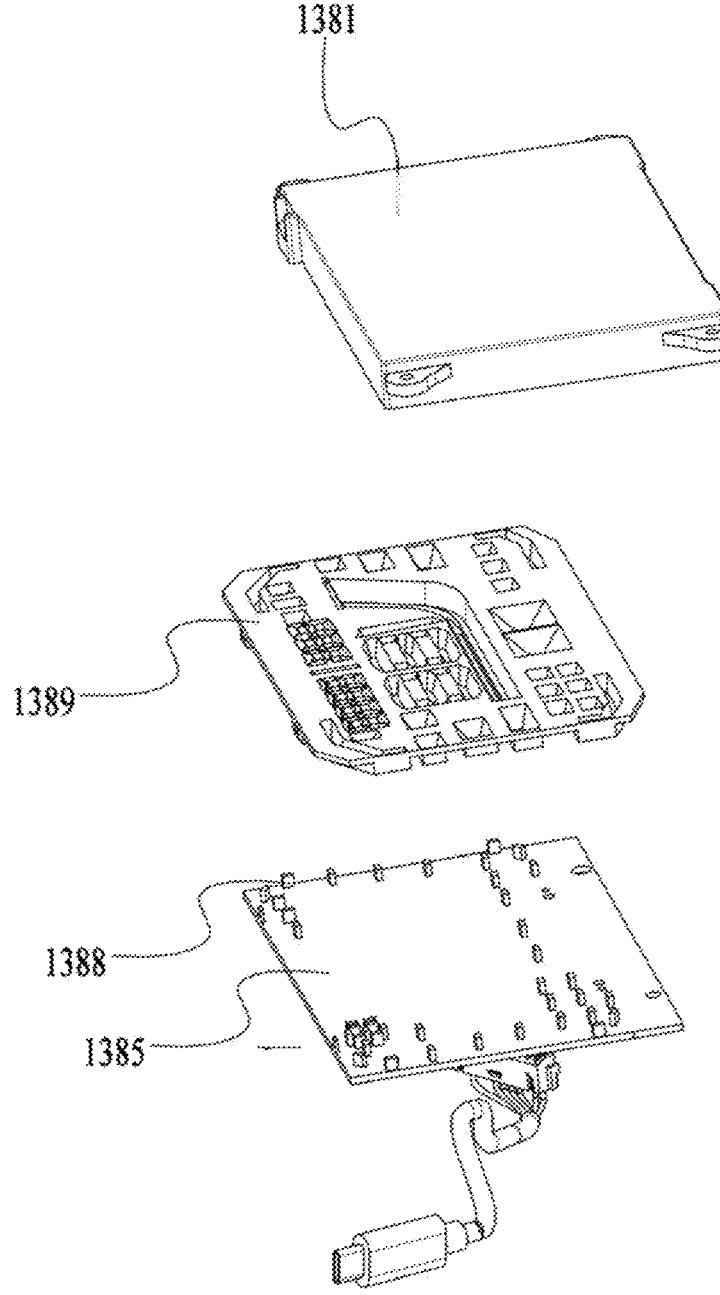
FIG. 16 is an exploded view of a display interface according to yet another example.

In one example, the display interface 138 may not include a screen layer 1380. That is, the display interface 138 does not have an LED screen or an LCD screen. Instead, as shown in FIG. 16, the display interface 138 includes a casing 1381 and a printed circuit board 1385 accommodated in the casing 1381. The casing 1381 may be made of tempered glass or polycarbonate (PC) materials, and the thickness of the casing 1381 is greater than 2 mm and less than or equal to 5 mm. The printed circuit board has a plurality of light-emitting elements 1388, such as LED lamp beads. The display interface 138 further includes a light-guiding layer 1389 engraved with light-guiding channels. The light-guiding layer 1389 may be a separate part or formed integrally with the casing 1381 as one piece. A sticker (not shown) may be adhered to the casing 1381 or the light-guiding layer 1388 to further improve the display effect. To prevent fogging, flexible adhesives are applied between the printed circuit board 1385 and the casing 1381 to seal a chamber at least including a space between the printed circuit board 1385 and the casing 1381. The independently sealed display interface 138 can then be assembled to a variety of gardening tools or power tools.

Figure 9:
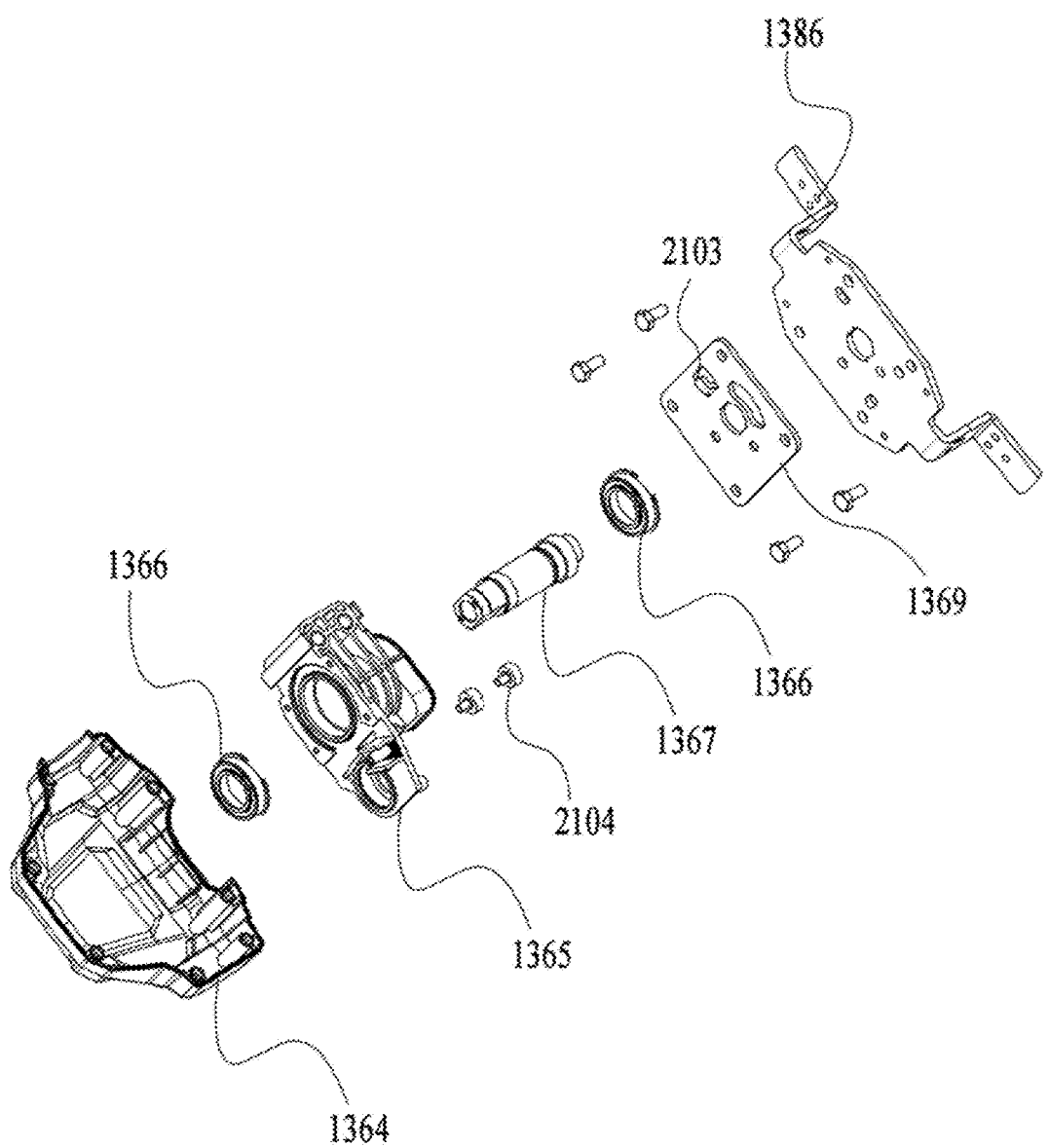
FIG. 9 is an exploded view of a part of the structure of the steering wheel assembly in FIG. 5.

In one example, the steering wheel assembly 136 includes a rotary shaft 1367 that is configured to form a synchronous rotation with the steering wheel 1362. The mounting assembly 1363 rotatably connects the steering wheel 1362 and the connecting rod 1361; in one example, the mounting assembly 1363 rotatably supports the rotary shaft 1367. Referring to FIG. 7, the mounting assembly 1363 further includes a mounting box 1364, which is fixedly connected to the connecting rod 1361 and rotatably supports the rotary shaft 1367. The mounting box 1364 may be formed in two halves and the two halves enclose the first end 2201 of the connecting rod 1361. The rotary shaft 1367 is fixedly coupled to the steering wheel 1362. When the user turns the steering wheel 1362, the rotary shaft 1367 rotates synchronously with the steering wheel 1362. In one example, the steering wheel 1362 and the rotary shaft 1367 both rotate about the first axis 107. In one construction, the steering wheel 1362 has a base plate 1386 and a fixing plate 1369, wherein the fixing plate 1369 is fixed to the base plate 1386 through a plurality of fasteners. The rotary shaft 1367 is engaged with at least one of the fixing plate 1369 and the base plate 1386, for example, through a flat fit. As shown in FIG. 9, the base plate 1386 has a double D hole, the fixing plate 1369 also has a double D hole, the rotary shaft 1367 has a double D portion which fits in the double D hole of the fixing plate 1369 and the base plate 1386. In one example, the rotary shaft 1367 is welded to the fixing plate 1369, thereby forming synchronous rotation with the fixing plate 1369. This structure ensures the stable connection between the rotary shaft 1367 and the steering wheel 1362.

In one construction, the mounting assembly further includes a supporting member 1365 and at least one bearing. The supporting member 1365 is accommodated inside the mounting box 1364; in one example, the supporting member 1365 is also fixed to the first end 2201 of the connecting rod 1361, for example, through fastening devices. The supporting member 1365 is formed with a channel for the rotary shaft 1367 at least one bearing pedestal for the at least one bearing. The at least one bearing is mounted to the supporting member 1365, and the rotary shaft 1367 is rotatably supported by the at least one bearing. In one example, there are two bearings supporting an upper portion of the rotary shaft 1367 and a lower portion of the rotary shaft 1367, respectively. The specific structure of the supporting member 1365 is not limited herein, as long as it supports the rotary shaft 1367 and enables the rotary shaft 1367 to rotate. In fact, the supporting member 1365 is not necessary if the mounting box 1364 is formed with corresponding structures to rotatably support the rotary shaft 1367.

In another example, the steering wheel assembly 136 includes an adjustment device operable to adjust the height of the steering wheel 1362. The adjustment device enables at least one of the supporting member 1365 and the mounting box 1364 to move in the up and down direction with respect to the connecting rod 1361, while the position of the adjustment device is fixed with respect to the connecting rod 1361. In one example, the supporting member 1365 is formed in the shape of a cylinder, and the adjustment device is enabled to fix to different positions of the cylinder. When the adjustment device is fixed to a lower position of the cylinder, the height of the steering wheel 1362 is relatively high; when the adjustment device is fixed to a higher position of the cylinder, the height of the steering wheel 1362 is relatively low.

In one example, the rotary shaft 1367 has a through hole, which allows a cable, or wire, to pass through the through hole. One end of the cable is connected to a first circuit board 1387, and the other end of the cable is connected to a second circuit board. In one example, the second circuit board is the printed circuit board 1385 of the display interface 138. In one example, referring to FIG. 7, the wire 1393 of the switch 1391 coupled with the operating member 139 is connected to the printed circuit board 1385 to reduce the number of wires. In one example, the wire 1393 of the switch 1391 coupled to the left paddle shifter 139L is connected to the printed circuit board 1385, and the wire 1393 of the switch 1391 coupled to the right paddle shifter 139R is connected to the printed circuit board 1385. Thus, the printed circuit board 1385 is the carrier for the switch signals of the operating member 139, the graphic signals of the display interface 138, and the switch signals of the buttons of the control panel 137. Therefore, only one cable, cable, connected with the printed circuit board 1385, is configured to pass through the making the wiring simple and clean. As the cable is inside the through hole of the rotary shaft 1367, the cable will not wear out easily, prolonging the service life of the steering wheel assembly 136.

In one example, the rotary shaft 1367 is coupled with a magnetic element, and the first circuit board 1387 has a position sensor that detects the angular position of the magnetic element. In one construction, the magnetic element is hanging to a lower end of the rotary shaft 1367 and rotates synchronously with the rotary shaft 1367, and the first circuit board 1387 is located under the magnetic element, with the position sensor directly facing the magnetic element. Other constructions are also acceptable as long as the position sensor detects the angular position of the steering wheel 1362 and the first circuit board 1387 receives the position signals detected by the position sensor. As the cable connects the first circuit board 1387 and the second circuit board, the first circuit board 1387 is not only the carrier for the angular position signals of the steering wheel 1362, but also the carrier for the switch signals of the operating member 139, the graphic signals of the display interface 138, and the switch signals of the buttons of the control panel 137. Further, another cable is connected to the first circuit board 1387 and passes through the connecting rod 1361, so that other components of the riding lawn mower 100, such as the walking assembly 12, the lighting assembly 18 and the cutting assembly 11 can exchange information with the steering wheel assembly 136, the control panel 137 and the display interface 138.

Figure 10:
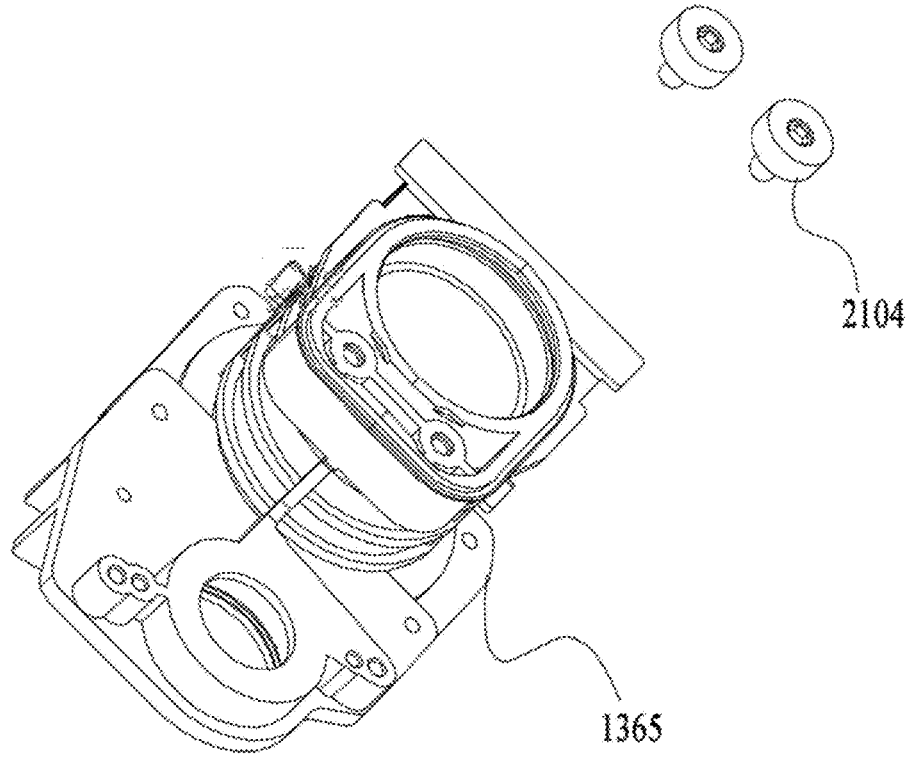
FIG. 10 is a perspective view of a supporting member 1365 of the steering wheel assembly in FIG. 5.

In one example, the fixing plate 1369 includes a stopper projection 2103 to limit an angle of rotation of the steering wheel 1362. The stopper projection 2103 may be formed in the shape of a hook protruding from the surface of the fixing plate 1369. The mounting box 1364 or the supporting member 1365 also includes a matching projection 2104 protruding out from the mounting box 1364 to limit the position of the stopper projection 2103. As shown in FIGS. 9-10, the supporting member 1365 is installed to the mounting box 1364 through at least one fastener, such as, for example, two bolts, and the two bolts are fastened to one side of the channel for the rotary shaft 1367. When the supporting member 1365 is assembled to the mounting box 1364, the heads of the two bolts protrude out from the mounting box 1364, wherein the head of the bolt is an example of the matching projection 2104, and there are two matching projections 2104. In the direction of the first axis 107, the distance between the mounting box 1364 and the fixing plate 1369 is less than the sum of the dimension of the stopper projection 2103 protruding out from the fixing plate 1369 and the dimension of the matching projection 2104 protruding out from the mounting box 1364, i.e., the height of the heads of the two bolts. Further, the distance from the stopper projection 2103 to the first axis 107 and the distance from the matching projection 2104 to the first axis 107 are about the same.

Figure 11A:
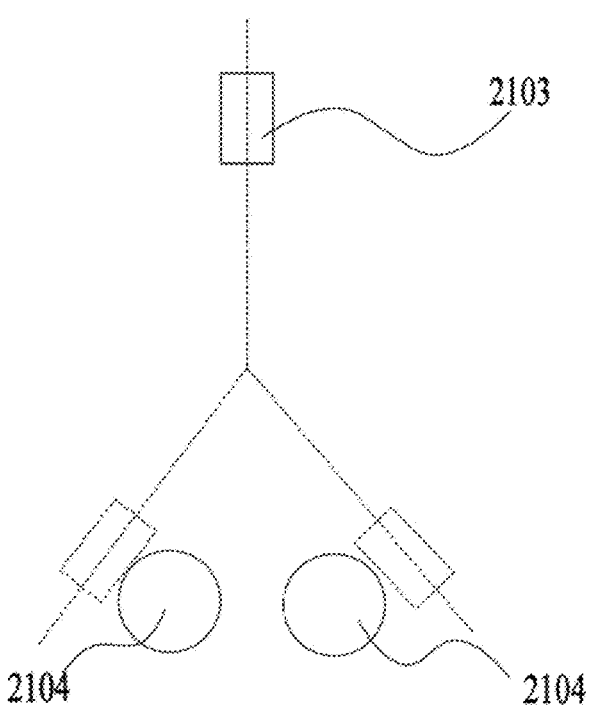
FIG. 11A is a schematic diagram of a structure for limiting an angle of rotation of the steering wheel according to an example.
Figure 11B:
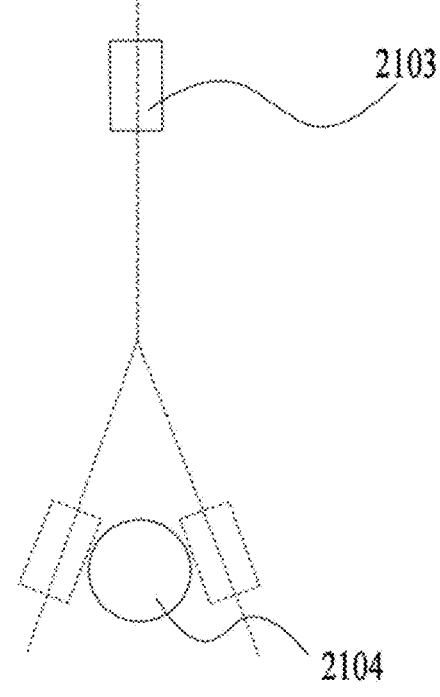
FIG. 11B is a schematic diagram of a structure for limiting an angle of rotation of the steering wheel according to another example.

Referring to FIG. 11A, in one example, when the user turns the steering wheel 1362 in a clockwise direction, the fixing plate 1369 rotates until the stopper projection 2103 reaches one of the two matching projections 2104. When the user turns the steering wheel 1362 in a counterclockwise direction, the fixing plate 1369 rotates until the stopper projection 2103 reaches the other one of the two matching projections 2104. In one example, referring to FIG. 11B, the at least one fastener is one bolt, so there is only one matching projection 2104. The fixing plate 1369 can rotate until the stopper projection 2103 reaches the matching projection 2104, no matter the fixing plate 1369 rotates in the clockwise direction or the counterclockwise direction. In this example, the at least one fastener realizes both functions of mounting the supporting member 1365 to the mounting box 1364 and limiting the position of the stopper projection 2103, so as to limit the angle of rotation of the steering wheel 1362. Further, the at least one fastener is firm, durable, low cost, and replaceable easily. In other examples, however, the matching projection 2104 is not a fastener; in fact, the matching projection 2104 may be any protruding structure that is configured to limit the rotational position of the stopper projection 2103.

Figure 12A:
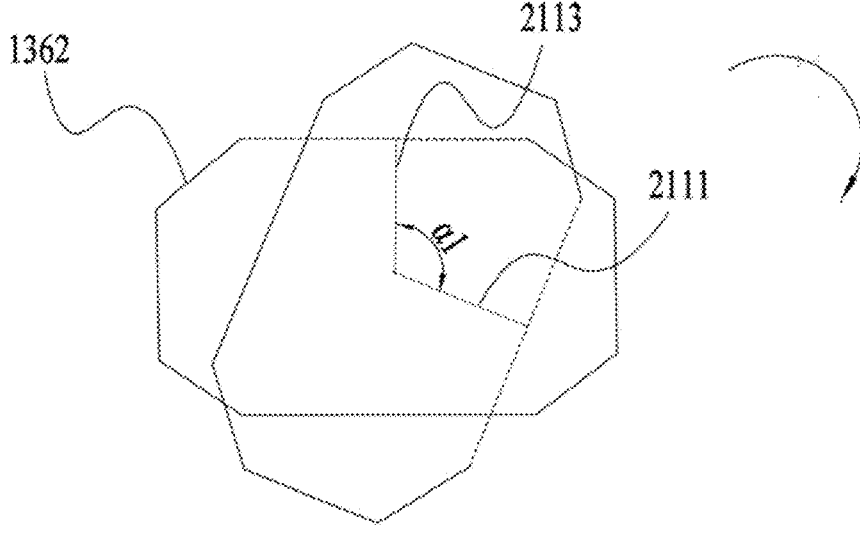
FIG. 12A is a schematic diagram of the steering wheel rotating clockwise.
Figure 12B:
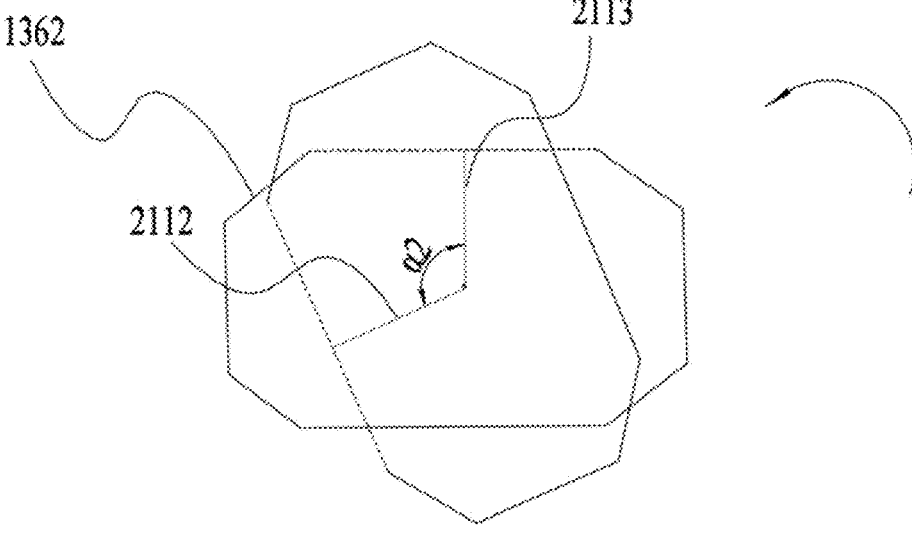
FIG. 12B is a schematic diagram of the steering wheel rotating counterclockwise.

Because of the stopper projection 2103 and the matching projection 2104, the steering wheel 1362 has a first limit position 2111 when rotating clockwise about the first axis, as shown in FIG. 12A and a second limit position 2112 when rotating counterclockwise about the first axis, as shown in FIG. 12B. In one example, the angle that the steering wheel 136 rotates from the first limit position 2111 to the second limit position 2112 is less than or equal to 380 degrees. In one example, the angle that the steering wheel 136 rotates from the first limit position 2111 to the second limit position 2112 is less than or equal to 320 degrees. In one example, the angle that the steering wheel 136 rotates from the first limit position 2111 to the second limit position 2112 is less than or equal to 240 degrees. In one example, the angle that the steering wheel 136 rotates from the first limit position 2111 to the second limit position 2112 is 270 degrees. As the steering wheel 1362 is configured to rotate clockwise and counterclockwise for the same degrees, the angle that the steering wheel 136 rotates from the first limit position 2111 to the second limit position 2112 can split equally. In other words, the steering wheel 1362 further has an initial position 2113, in which the steering wheel 1362 is symmetrical about the second axis 108. In one example, the angle $\alpha 1$ that the steering wheel 136 rotates from the initial position 2113 to the first limit position 2111 is less than or equal to 190 degrees, and the angle $\alpha 2$ that the steering wheel 136 rotates from the initial position 2113 to the second limit position 2112 is less than or equal to 190 degrees. In one example, the angle $\alpha 1$ that the steering wheel 136 rotates from the initial position 2113 to the first limit position 2111 is less than or equal to 160 degrees, and the angle $\alpha 2$ that the steering wheel 136 rotates from the initial position 2113 to the second limit position 2112 is less than or equal to 160 degrees. In one example, the angle $\alpha 1$ that the steering wheel 136 rotates from the initial position 2113 to the first limit position 2111 is less than or equal to 120 degrees, and the angle $\alpha 2$ that the steering wheel 136 rotates from the initial position 2113 to the second limit position 2112 is less than or equal to 120 degrees. In one example, the angle $\alpha 1$ that the steering wheel 136 rotates from the initial position 2113 to the first limit position 2111 is 135 degrees, and the angle $\alpha 2$ that the steering wheel 136 rotates from the initial position 2113 to the second limit position 2112 is 135 degrees.

Figure 8:
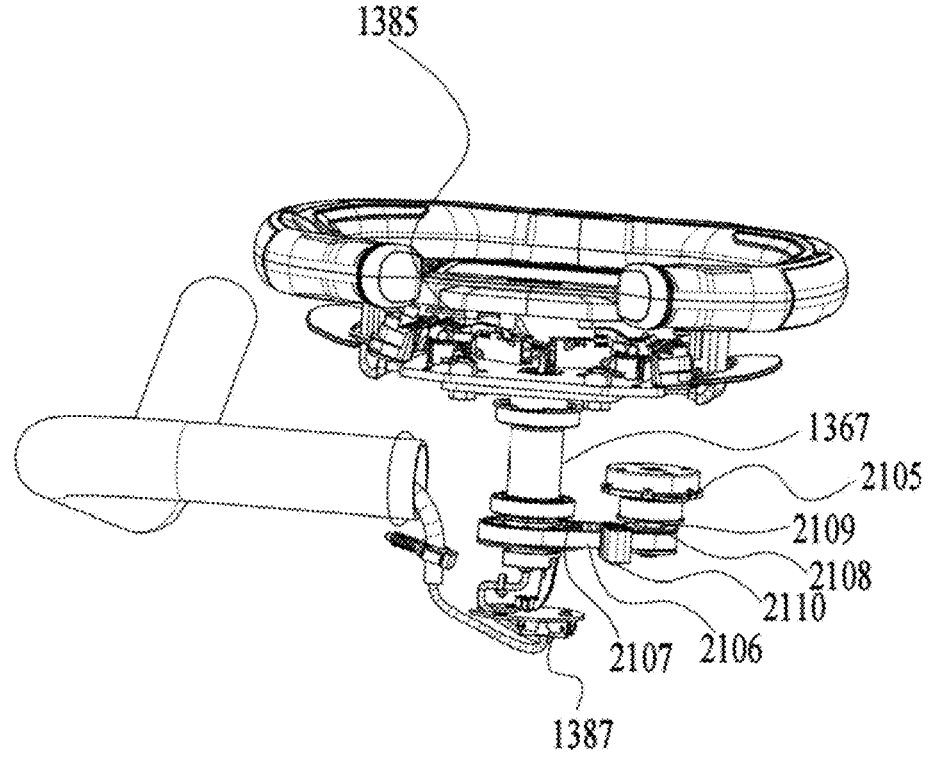
FIG. 8 is a perspective view of the steering wheel assembly in FIG. 5, with covering removed.

In one example, the steering wheel assembly 136 further includes a damper 2105, and the rotary shaft 1367 and the damper 2105 transmit force through a belt drive. In one example, the damper 2105 is a rotary damper, or called disk damper. As shown in FIG. 8, the rotary shaft 1367 is coupled with a gearwheel 2107. In one construction, the gearwheel 2107 has a double D hole, which fits in a double D portion of the rotary shaft 1367. The damper 2105 is also coupled with a gear 2108. In one construction, the damper 2105 has a shaft 2109, and the gear 2108 is fixed to the shaft 2109 of the damper 2105. The gearwheel 2107 and the gear 2108 are both engaged with a belt 2106. The belt 2106 transmits force from the gearwheel 2107 to the gear 2108 and from the gear 2108 to the gearwheel 2107. When the user turns the steering wheel 1362, the rotary shaft 1367 rotates, causing the gearwheel 2107 to rotate. When the gearwheel 2107 rotates, the belt rotates and passes the rotary force to the gear 2108 and the shaft. When the shaft rotates, the viscosity of the sealed oil in the damper's body will create resistance to the movement of the shaft 2109. This resistance (or called viscous friction) will slow down the movement speed of the steering wheel 1362. When the damper 2105 moves, its torque is generally influenced by the viscosity of the sealed oil. When the user releases the steering wheel 1362, the resistance created by the viscosity of the sealed oil drives the shaft to rotate to its initial position and therefore the steering wheel 1362 to its initial position 2113. In one example, to ensure effective force transmission between the rotary shaft 1367 and the shaft 2109 of the damper 2105, the belt 2106 is further provided with a tension device 2110. In one example, at least part of the damper 2105 and the belt drive is accommodated inside the supporting member 1365, which provides better fixation and protection. It is noted that, the specific structure of the damper 2105 is not limited herein; and in some examples, the damper 2105 can be replaced by a motor to provide damping effect. Further, if a motor is used to provide damping effect, the angular position of the steering wheel 1362 can be calculated from the rotational position of the motor and the transmission ratio of the belt drive, thereby eliminating the need for extra sensors for detecting the angular position of the steering wheel 1362.

Figure 22:
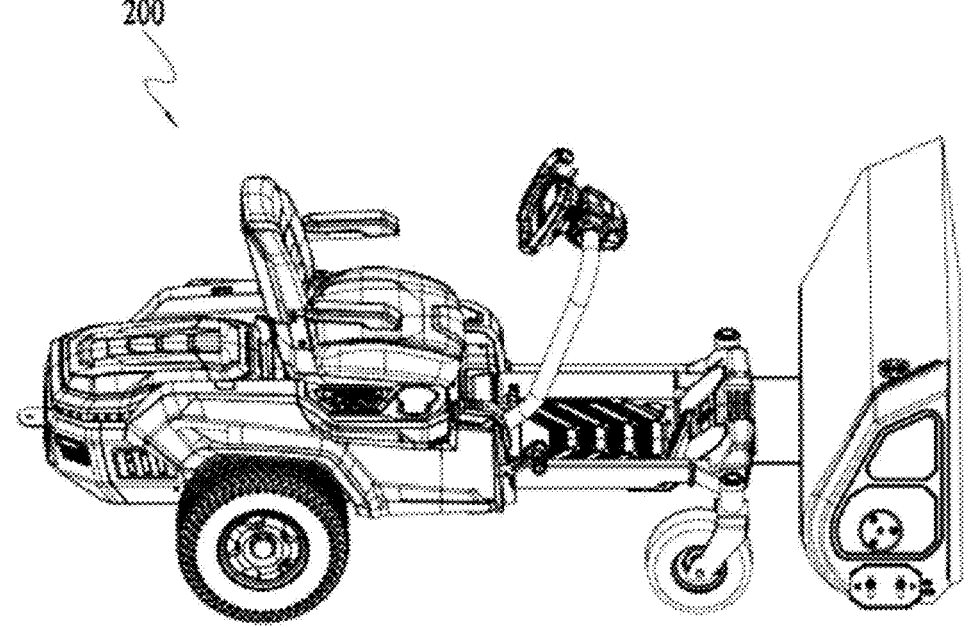
FIG. 22 is a perspective view of a riding snow blower according to an example of the present application.

Aspects of this disclosure are also applicable to riding machines of other types, as long as the riding machine can output power in other forms besides walking power in order to realize other functions besides walking, for example, the riding snow blower 200 as shown in FIG. 22 also adopts the same or similar design of examples described above.

What is claimed is:

1. A riding lawn mower, comprising:
a seat for a user to sit thereon;
a chassis configured to support the seat;
a cutting assembly mounted to the chassis, the cutting assembly comprising a cutting member for cutting grass;
a walking assembly configured to drive the riding lawn mower to walk on a plane; and
a steering wheel assembly comprising a steering wheel operable by the user, a connecting rod configured to connect the steering wheel and the chassis, and a pivot assembly that rotatably connects the connecting rod and the chassis and enables the steering wheel assembly to switch between a working position and a storage position;
wherein a distance between the steering wheel and the plane when the steering wheel assembly is in the storage position is smaller than a distance between the steering wheel and the plane when the steering wheel assembly is in the working position, and
wherein the pivot assembly is disposed under the seat so that the steering wheel is located towards a side of the seat when the steering wheel assembly is switched to the storage position.

2. The riding lawn mower of claim 1, wherein the connecting rod has a first end connected with the steering wheel and a second end connected with the chassis through the pivot assembly.

3. The riding lawn mower of claim 1, further comprising a left cover member and a right cover member, wherein the left cover member is located on a left side of the seat and the right cover member is located on a right side of the seat.

4. The riding lawn mower of claim 3, wherein the right cover member covers the pivot assembly.

5. The riding lawn mower of claim 3, wherein a height of the left cover member is lower than a height of the right cover member.

6. The riding lawn mower of claim 1, wherein, when the steering wheel assembly is in the working position, a difference of a perpendicular distance from a highest point of the steering wheel assembly to the plane and a perpendicular distance from a sitting surface of the seat to the plane is greater than or equal to 30 cm and less than or equal to 50 cm.

7. The riding lawn mower of claim 1, wherein, when the steering wheel assembly is in the working position, a perpendicular distance from a highest point of the steering wheel assembly to the plane is greater than or equal to 80 cm and less than or equal to 120 cm.

8. The riding lawn mower of claim 1, wherein, when the steering wheel assembly is in the working position, a distance between orthographic projections of the steering wheel assembly and a back of the seat on the plane is greater than or equal to 60 cm and less than or equal to 100 cm.

9. The riding lawn mower of claim 1, wherein the steering wheel assembly further comprises an adjustment device operable to adjust a height of the steering wheel.

10. The riding lawn mower of claim 1, wherein the steering wheel is configured to rotate about a first axis to control a steering direction of the riding lawn mower, the steering wheel has a first limit position when rotating clockwise about the first axis, and a second limit position when rotating counterclockwise about the first axis, and an angle that the steering wheel rotates from the first limit position to the second limit position is less than or equal to 380 degrees.

11. The riding lawn mower of claim 10, wherein the steering wheel further has an initial position, an angle that the steering wheel rotates from the initial position to the first limit position is less than or equal to 190 degrees, and an angle that the steering wheel rotates from the initial position to the second limit position is less than or equal to 190 degrees.

12. The riding lawn mower of claim 1, further comprising a display interface mounted on the steering wheel.

13. The riding lawn mower of claim 1, further comprising a paddle shifter mounted near the steering wheel.

14. The riding lawn mower of claim 1, further comprising a pedal assembly operable by the user to control a walking speed of the riding lawn mower, wherein the riding lawn mower has a central axis, the riding lawn mower is at least partially symmetrical about a central vertical plane passing through the central axis, the connecting rod has a first end connected with the steering wheel and a second end connected with the chassis, and the pedal assembly and the second end of the connecting rod are located on a same side of the central vertical plane.

15. The riding lawn mower of claim 14, further comprising a step bar mounted to the chassis, wherein the step bar is located on an opposite side of central vertical plane to the pedal assembly.

16. A riding machine, comprising:
a seat for a user to sit thereon;
a chassis configured to support the seat;
a walking assembly configured to drive the riding machine to walk on a plane; and
a steering wheel assembly comprising a steering wheel operable by the user, a connecting rod configured to connect the steering wheel and the chassis, and a pivot assembly that rotatably connects the connecting rod and the chassis and enables the steering wheel assembly to switch between a working position and a storage position;

wherein a distance between the steering wheel and the plane when the steering wheel assembly is in the storage position is smaller than a distance between the steering wheel and the plane when the steering wheel assembly is in the working position, wherein the connecting rod is rotatably mounted on a right side or a left side of the seat through the pivot assembly so that at least a part of the connecting rod is located on the right side or the left side of the seat and is adjacent a bottom plate of the chassis.

17. The riding machine of claim 16, wherein the connecting rod has a first end connected with the steering wheel and a second end connected with the chassis, and the pivot assembly comprises a first part fixedly connected with the chassis and a second part fixedly connected with the second end of the connecting rod.

18. The riding machine of claim 16, wherein, in the storage position, the connecting rod is lied down on the chassis.

19. A riding lawn mower, comprising:

a seat;

30 a chassis supporting the seat;

a cutting assembly mounted to the chassis, the cutting assembly comprising a cutting member for cutting grass;

a drive assembly configured to drive the riding lawn mower to move on a plane; and a steering wheel assembly comprising a steering wheel, a connecting rod configured to operably couple the steering wheel and the chassis, and a pivot assembly that rotatably connects the connecting rod to the chassis, the pivot assembly being rotatable to enable the steering wheel assembly to switch between a working position and a storage position; and a pedal assembly mounted to the chassis and operable to control a drive speed of the riding lawn mower, wherein a distance between the steering wheel and the plane when the steering wheel assembly is in the storage position is smaller than a distance between the steering wheel and the plane when the steering wheel assembly is in the working position, and wherein the steering wheel is adjacent the pedal assembly when the steering wheel assembly is in the storage position.

* * * * *